(12) United States Patent
Michieli et al.

(10) Patent No.: US 11,983,591 B2
(45) Date of Patent: May 14, 2024

(54) RECOVERED PLASTIC CARDS

(71) Applicant: CPI CARD GROUP-COLORADO, INC., Littleton, CO (US)

(72) Inventors: Maxmillian David Michieli, Littleton, CO (US); James P. Colleran, Centennial, CO (US); Barry Mosteller, Castle Pines, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 0 days.

(21) Appl. No.: 18/012,485

(22) PCT Filed: Jun. 24, 2021

(86) PCT No.: PCT/US2021/038919
§ 371 (c)(1),
(2) Date: Dec. 22, 2022

(87) PCT Pub. No.: WO2021/262994
PCT Pub. Date: Dec. 30, 2021

(65) Prior Publication Data
US 2023/0306229 A1 Sep. 28, 2023

Related U.S. Application Data

(60) Provisional application No. 63/044,228, filed on Jun. 25, 2020.

(51) Int. Cl.
*G06K 19/07* (2006.01)
*G06K 19/077* (2006.01)

(52) U.S. Cl.
CPC ............... *G06K 19/07722* (2013.01)

(58) Field of Classification Search
CPC .... G07F 19/207; G07F 19/204; H04W 12/63; H04W 12/069; H04W 12/041; H04W 12/12

(Continued)

(56) References Cited

U.S. PATENT DOCUMENTS

| 6,514,367 B1 | 2/2003 | Leighton |
| 8,678,442 B2 | 3/2014 | Bergsmann et al. |

(Continued)

FOREIGN PATENT DOCUMENTS

| CA | 3127909 A1 | 8/2020 |
| CN | 1638976 A | 7/2005 |

(Continued)

OTHER PUBLICATIONS

International Search Report and Written Opinion dated May 15, 2020, in PCT Application No. PCT/US2020/015838, 16 pages.

(Continued)

*Primary Examiner* — Daniel A Hess
(74) *Attorney, Agent, or Firm* — Dorsey & Whitney LLP

(57) ABSTRACT

A laminated transaction card may comprise a core layer comprising post-consumer polyethylene, a first support layer comprising polyethylene terephthalate glycol coupled to a first surface of the core layer by a first adhesive layer, and a second support layer comprising polyethylene terephthalate glycol coupled to a second surface of the core layer by a second adhesive layer. The first adhesive layer and the second adhesive layer may comprise an adhesive formulated to bond the post-consumer polyethylene and the support layers.

20 Claims, 17 Drawing Sheets

(58) Field of Classification Search
USPC .......................................................... 235/379
See application file for complete search history.

(56) References Cited

U.S. PATENT DOCUMENTS

| | | | |
|---|---|---|---|
| 10,300,732 | B2 | 5/2019 | Yamada |
| 2004/0101669 | A1 | 5/2004 | Chang |
| 2005/0123729 | A1 | 6/2005 | Beyer-Meklenburg et al. |
| 2007/0243362 | A1* | 10/2007 | Gilbert ................ B29B 17/0042 428/411.1 |
| 2011/0084148 | A1 | 4/2011 | Ricketts et al. |
| 2012/0021225 | A1 | 1/2012 | Maekawa et al. |
| 2013/0206842 | A1 | 8/2013 | Raz |
| 2019/0385035 | A1* | 12/2019 | Mosteller ............... B42D 25/47 |
| 2022/0121895 | A1* | 4/2022 | Michieli ................ B32B 15/08 |

FOREIGN PATENT DOCUMENTS

| | | |
|---|---|---|
| CN | 102822305 A | 12/2012 |
| JP | H11501260 A | 2/1999 |
| JP | 11-100559 | 4/1999 |
| JP | 2003011304 A | 1/2003 |
| JP | 2004318606 A | 11/2004 |
| JP | 2005044059 A | 2/2005 |
| JP | 2005518967 A | 6/2005 |
| JP | 2012-196903 | 10/2012 |
| JP | 2019064143 A | 4/2019 |
| JP | 7351916 B2 | 9/2023 |
| WO | 9611803 A1 | 4/1996 |
| WO | 03074291 A2 | 9/2003 |
| WO | 2018152218 A1 | 8/2018 |
| WO | 2018202774 A1 | 11/2018 |
| WO | 2020160239 A1 | 8/2020 |

OTHER PUBLICATIONS

International Search Report and Written Opinion dated Oct. 19, 2021, in International Patent Application No. PCT/US2021/038919, 10 pages.
Chinese National Intellectual Property Administration, English Translation of Search Report dated Jan. 20, 2023, In Chinese Application No. 202080026069.5, 3 pages.
National Institute of Standards and Technology, "ISO/IEC 7810:2019(en), Identification cards—Physical characteristics," Jun. 26, 2023, Available on the Internet at https://www.iso.org/obp/ui/en/#iso:std:iso-iec:7810:ed-4:v1:en, 4 pages.
Australian Patent Office, "Examination Report No. 3," dated Jun. 26, 2023, for Australian Application No. 2020216396, 4 pages.
Japanese Patent Office, "Notice of Reasons for Rejection," Japanese with English translation, dated Nov. 15, 2023, for Japanese Application No. 2022-580311, 15 pages.
Taiwan Intellectual Property Office, "English Translation of Search Report," dated Nov. 17, 2023, for Taiwan Application No. 109103115, 1 page.

* cited by examiner

RECOVERED PLASTIC CARDS

CROSS REFERENCE TO RELATED APPLICATIONS

This application claims priority to U.S. patent application Ser. No. 63/044,228, entitled "RECOVERED PLASTIC CARDS," filed on Jun. 25, 2020, which is hereby incorporated by reference in its entirety.

Additionally, the present application is related to U.S. Provisional Application No. 62/799,145 entitled "RECOVERED PLASTIC CARDS," filed on Jan. 31, 2019, U.S. Provisional Application No. 62/894,091 entitled "RECOVERED PLASTIC CARDS," filed on Aug. 30, 2019, and PCT Application No. PCT/US2020/015838 entitled "RECOVERED PLASTIC CARDS," filed on Jan. 30, 2020, each of which are incorporated by reference herein.

FIELD OF THE INVENTION

The present invention relates to the use of recovered plastic in cards, and in particular, to the use of post-consumer polyethylene (e.g. recovered ocean-bound plastic waste) in laminated cards (e.g. payments cards, membership cards, loyalty cards, identification cards, premises access cards and other cards having account indicia associated therewith).

BACKGROUND

Millions of tons of plastic waste are introduced into the global waste stream each year, with a significant portion of such waste entering oceans and other water bodies. In the later regard, recent estimates indicate that at least 8 million tons of plastic waste enter the Earth's oceans yearly.

While plastic recovery and reuse efforts have been ongoing for many years, only recently have such efforts focused on the collection, recovery and post-consumer use of ocean-bound plastic waste. In particular, recovered ocean-bound plastic waste includes high-density polyethylene resin, or HDPE, typically formed in to pellets or flakes for manufacture and use in products.

The usage of post-consumer HDPE is often limited to non-blended applications due to the tendency of different types of plastics to result in phase boundaries causing structural weakness when melted together. Further, HDPE has mechanical and thermal properties which present impediments for many product applications. Metallized layers may increase the aesthetics of transaction cards but such layers typically cannot be utilized in transaction or other laminated cards in conjunction with post-consumer HDPE due to the mechanical and thermal properties of HDPE.

SUMMARY

The present disclosure is directed to laminated cards and production methods that employ post-consumer polyethylene, thereby providing a significant product market to promote the recovery and reuse of plastic waste, including in particular ocean-bound plastic waste, while also advantageously reducing the use of virgin plastics.

An inlay for a laminated transaction card may include a core layer comprising post-consumer polyethylene. A first support layer is adhered to a first surface of the core layer by a first adhesive layer positioned between the first support layer and the first surface of the core layer. A material of the first support layer is different than the post-consumer polyethylene of the core layer. A second support layer is adhered to a second surface of the core layer by a second adhesive layer positioned between the second support layer and the second surface of the core layer. A material of the second support layer is different than the post-consumer polyethylene of the core layer.

A laminated transaction card may comprise post-consumer polyethylene with a thickness of at least 30% of a thickness of the laminated transaction card. A first polymer-based layer comprising polyvinyl chloride is coupled to a first surface of the core layer by a first adhesive layer. A second polymer-based layer comprising polyvinyl chloride is coupled to a second surface of the core layer by a second adhesive layer. The first adhesive layer and the second adhesive layer comprise an adhesive formulated to bond the post-consumer polyethylene and the polymer-based layers.

Producing a laminated transaction card includes treating a first surface and a second surface of a core layer so as to increase the surface energy of the core layer, wherein the core layer comprises post-consumer polyethylene. A first support layer and a second support layer are positioned on opposing sides of the core layer. A first adhesive layer is positioned between the first polymer-based layer and the first surface of the core layer and a second adhesive layer is positioned between the second support layer and the second surface of the core layer. The first adhesive layer and the second adhesive layer are activated to bond the first support layer to the first surface of the core layer and to bond the second support layer to the second surface of the core layer.

A laminated transaction card may include a core layer comprising post-consumer polyethylene, a first lacquer layer applied to a first surface of the core layer, and a second lacquer layer applied to a second surface of the core layer. At least one printed ink layer is applied to an exterior surface of the laminated transaction card.

In some embodiments, a laminated card may include a core layer comprising at least about 70%, and typically at least about 90%, post-consumer and/or post-industrial polyethylene by weight, and having a thickness of at least about 15%, and typically at least about 30%, of a total thickness of the laminated card. The laminated card may further include a polymer-based first support layer interconnected on an inward-facing side thereof to a first side of the core layer by a first thermoplastic adhesive layer (e.g. interconnected indirectly or directly), and a polymer-based second support layer interconnected on an inward-facing side thereof to a second side of the core layer by a second thermoplastic adhesive layer (e.g. interconnected indirectly or directly). The laminated card may further include human-readable account indicia visible from and defined at an outer surface of one of a first side and a second side of the laminated card to facilitate association of the laminated card with an account maintained by or on behalf of a given card issuer (e.g. a unique account number).

Additionally, or alternatively, the laminated card may include machine-readable functionality to facilitate association of the laminated card with an account maintained by or on behalf of a given card issuer. Such functionality may include contact and/or contactless chip card features to facilitate signal interface with contact and/or contactless chip card readers, respectively, as will be further described.

In some embodiments, the first support layer may have a thickness of at least about 12%, and in some applications at least about 15% or even 18%, of a total thickness of the laminated card. Similarly, the second support layer may have a thickness of at least about 12%, and in some applications at least about 15% or even 18%, of a total thickness of the laminated card. In contemplated embodiments, the first thermoplastic adhesive layer may directly contact the first side of the core layer, and/or the second thermoplastic adhesive layer may directly contact the second side of the core layer. In that regard, the use of thermoplastic adhesives yields enhanced direct bonding with the core layer.

In one approach, the first thermoplastic adhesive layer may be directly connected (e.g. bonded) to an inward-facing side of a first carrier layer that is thereby connected to the first side of the core layer, and the second thermoplastic adhesive layer may be directly connected (e.g. bonded) to an inward-facing side of a second carrier layer that is thereby connected to the second side of the core layer. In turn, a first intermediate thermoplastic or thermosetting adhesive layer may be directly connected (e.g. bonded) to an inward-facing side of the first support layer that is thereby connected to an outward-facing side of the first carrier layer, and a second intermediate thermoplastic or thermosetting adhesive layer may be directly connected (e.g. bonded) to an inward-facing side of the second support layer that is thereby connected to an outward-facing side of the second carrier layer. In another approach, the first thermoplastic adhesive layer may be directly connected (e.g. bonded) to an inward-facing side of a first support layer that is thereby connected to the first side of the core layer, and the second thermoplastic adhesive layer may be directly connected (e.g. bonded) to an inward-facing side of a second support layer that is thereby connected to the second side of the core layer.

The first side and/or the second side of the core layer may have a surface energy of at least about 34 dyne, and preferably at least about 40 dyne or even at least about 58 dyne. Such surface energy provides for enhanced bonding with the first thermoplastic adhesive layer and/or second thermoplastic adhesive layer, and may be achieved by treating the first side and/or second side of the core layer prior to production, using techniques identified herein. In one approach, the first side and/or second side of the core layer may be treated to have a surface energy of about 58 dyne The inward-facing side and/or an outward-facing side of the first support layer may have a surface energy of at least about 30 dyne, and/or the inward-facing side and/or an outward-facing side of the second support layer may have a surface energy of at least about 30 dyne.

The first and second thermoplastic adhesive layers, and when utilized the first and second intermediate thermoplastic or thermosetting adhesive layers, may have corresponding activation temperatures that are less than melting point temperatures corresponding with the core layer and first and second support layers, and when utilized the first and second carrier layers. In that regard, the first and second thermoplastic adhesive layers, and when utilized the first and second intermediate thermoplastic or thermosetting adhesive layers, may have corresponding activation temperatures of no more than about 130° C., or no more than about 120° C. (e.g. about 90° C. to about 120° C.) In some implementations, the first and second thermoplastic adhesive layers, and when utilized the first and second intermediate thermoplastic or thermosetting adhesive layers, may have corresponding activation temperatures of at least about 85° C. The melting point temperatures corresponding with the core layer, and first and second support layers, and when utilized, the first and second carrier layers, may be greater than about 130° C., and in contemplated embodiments greater than about 135° C.

In some implementations, the first and second support layers may each have a tensile strength that is greater than a tensile strength of the core layer, and in some cases at least about 30% or even at least about 50% greater. In some arrangements, the first and second support layers may have corresponding tensile strengths of at least about 30 N/mm$^2$ (ASTM Standard D-882), and in some cases at least about 40 N/mm$^2$ (ASTM Standard D-882), and the core layer may have a tensile strength of at least about 20 N/mm$^2$ (ASTM Standard D-882), and in some cases at least about 25 N/mm$^2$ (ASTM Standard D-882). In conjunction with such embodiments, the first and second thermoplastic adhesive layers, and when utilized the first and second intermediate thermoplastic or thermosetting adhesive layers, may have corresponding tensile strengths that are greater than the tensile strengths of the core layer and first and second support layers.

In various embodiments, the laminated card may define a length and a width, with the core layer, the first support layer and second support layer, and when utilized the first and second carrier layers, each having the same length and width, and each having a corresponding, substantially uniform thickness across the length and width of the laminated card. In that regard, peripheral edges of each of the core layer and/or the first and second core layers may extend continuously and may be visible about the entire periphery of the transaction card. In typical arrangements, the length, width and thickness of the laminated card may be substantially compliant with ISO/IEC Standard 7810.

The utilization of a "sandwich" card construction in which a relatively thick core layer comprising post-consumer and/or post-industrial polyethylene is interconnected by first and second thermoplastic adhesive layers to corresponding first and second support layers yields a laminated card having satisfactory mechanical properties, while also providing environmental-related benefits and cost efficiencies. Indeed, given the large quantities of payment cards (e.g. credit, debit, and stored value cards), membership cards, loyalty cards, identification cards, premises access cards, and other wallet-sized cards deployed globally on an annual basis, disclosed embodiments are believed to provide an attractive avenue to provide such cards and thereby consume significant amounts of post-consumer HDPE, and in particular, recovered ocean-bound plastic waste.

In the later regard, the post-consumer polyethylene of the core layer may comprise at least about 50% by weight, and typically at least about 90% or even 99% by weight, recovered ocean-bound plastic waste. Further, the core layer may be provided to have a density of at least about 0.9 g/cm$^3$. And, in some embodiments, the thickness of the core layer may be increased to at least about 50% of a total thickness of the laminated card.

As indicated, the first thermoplastic adhesive layer and the second thermoplastic adhesive layer, and when utilized the first and second intermediate thermoplastic or thermosetting adhesive layers, may have activation temperatures that are no more than about 130° C., or no more than about 120° C. (e.g. about 90° C. to about 120° C.), and in any case, less than melting point temperatures of the first support layer, the second support layer, and the core layer, and when utilized the first and second carrier layers, thereby facilitating activation of the first and second thermoplastic layers, and when utilized the first and second intermediate thermoplastic or thermosetting adhesive layers, for bonded interconnection of the core layer to the first and second support layers, and when utilized the first and second carrier layers, substantially free from varying the relative positions of the core layer and first and second support layers, and when utilized the first and second carrier layers. In turn, reliable laminated card integrity is promoted. In conjunction with some embodiments, the first support layer and the second support layer may have corresponding Vicat softening temperatures of at least about 80° C. (ISO/IEC Standard D-1525A), and the core layer may have a Vicat softening temperature of at least about 110° C. (ISO/IEC Standard D-1525A), and in some cases at least about 120° C. (ISO/IEC Standard D-1525A).

In contemplated implementations, the core layer, the first support layer and the second support layer, and when utilized the first and second carrier layers. may be interconnected by activation of the first and second thermoplastic adhesive layers, and when utilized the first and second intermediate thermoplastic or thermosetting adhesive layers, in a lamination process that includes heating the plurality of card layers to obtain a temperature of at least about 85° C. and no more than about 120° C., or in some cases no more than about 135° C. (e.g. about 90° to about 130° C.), across the plurality of card layers, wherein a pressure of about 0.55 N/mm$^2$ to about 0.83 N/mm$^2$ (e.g. about 0.67 N/mm$^2$), and no greater than about 0.90 N/mm$^2$, is applied across the plurality of card layers during the heating (e.g. for a total duration of about 10 minutes to about 30 minutes). The utilization of a relatively low temperature and unusually low pressure in the lamination process facilitates the realization of desired card characteristics, including compliance with mechanical aspects of ISO/IEC Standards 7810. After the heating, the lamination process may include cooling the plurality of card layers cool while applying a pressure of about 0.55.N/mm$^2$ to about 0.83 N/mm$^2$ (e.g. about 0.67 N mm$^2$), and no greater than about 0.90 N/mm$^2$, across the plurality of card layers (e.g. for a duration of up to about 4 minutes), and then while applying a pressure of at least about 1.0 N/mm$^2$ across the plurality of card layers (e.g. for a total duration of about 10 minutes to about 30 minutes).

In some embodiments, a plurality of inlay layers comprising the core layer, the first carrier layer with the first thermoplastic adhesive layer connected thereto, and the second carrier layer with the second thermoplastic adhesive layer connected thereto, may be interconnected in a prelamination process to provide an interconnected inlay. In turn, the inlay may be disposed as a an interconnected layer between and laminated in the lamination process to the first support layer having the first intermediate thermoplastic or thermosetting adhesive layer connected thereto, and to the second support layer having the second intermediate thermoplastic or thermosetting adhesive layer connected thereto. In such embodiments, the inlay may also include an antenna, and optionally an integrated circuit chip operatively connected to the antenna, located on the core layer prior to prelamination (e.g. supportably located on the first side thereof), between the core layer and the first carrier layer, to facilitate contactless card functionalities (e.g. contactless only and/or dual interface card functionality). In other embodiments, the antenna may be operatively interconnected to an integrated circuit chip that is disposed in a pocket formed on the first side of the laminated card after the prelamination and lamination processes.

In conjunction with such embodiments, the prelamination process may include heating the plurality of inlay layers to obtain a temperature of no more than about 120° C. or 135° C. (e.g. about 90° to about 130° C.), across the plurality of inlay layers, wherein a pressure of about 0.55 N/mm$^2$ to about 0.83 N/mm$^2$ (e.g. about 67 N mm$^2$), and no greater than about 0.90 N/mm$^2$, is applied across the plurality of inlay layers during the heating (e.g. for a total duration of about 10 minutes to about 30 minutes). The utilization of a relatively low temperature and unusually low pressure in the prelamination process facilitates the realization of desired card characteristics, including compliance with ISO/IEC Standard 7810, while also providing compliance with contact, contactless and/or dual interface transaction card requirements. After the heating, the prelamination process may include cooling the plurality of inlay layers while applying a pressure of about 0.55 N/mm$^2$ to about 0.83 N/mm$^2$ (e.g. about 0.67 N mm$^2$), and not greater than about 0.90 N/mm$^2$, across the plurality of inlay layers (e.g. for total duration of up to about 4 minutes), and then while applying a pressure of at least about 1.0 N/mm$^2$ across the plurality of inlay layers (e.g. for a total duration of about 10 minutes to about 30 minutes).

In some embodiments, the first support layer and the second support layer, and if utilized the first carrier layer and the second carrier layer, may comprise the same one or different ones of one or more of the following polymers:
  polyvinyl chloride;
  polyethylene terephthalate glycol;
  polyethylene terephthalate; and,
  polycarbonate.

In one approach, the first and second support layers may each comprise the same polymer. In some embodiments, at least a portion or all of the first support layer and/or the second support layer may comprise either virgin or recycled polymer(s). In the later regard, the laminated card may comprise a core layer and first and second support layers that cumulatively comprise post-consumer and/or post-industrial polymer(s), including e.g. polyethylene, in an amount corresponding with at least about 90%, or even up to about 99%, of a total weight of the laminated card. Further, the first carrier layer and the second carrier layer may comprise the same polymer, which may be the same or different than the polymer comprising the first layer and/or second layer, including virgin and/or recycled polymer(s).

In various embodiments, the first support layer and/or the second support layer, and if utilized the first carrier layer and/or the second carrier layer, may be opaque, translucent or transparent, and may be colorized. Additionally, the core layer, and optionally the first and second support layers, may be colorized. Such colorization may be provided by the blending of colorants with the materials utilized in such layers.

In various embodiments, the first thermoplastic adhesive layer and the second thermoplastic adhesive layer may comprise the same one or different ones of one or more of the following:
  ethylene vinyl acetate ("EVA");
  acrylic; and,
  urethane.

In one approach, the first and second thermoplastic adhesive layers may comprise ethylene vinyl acetate (e.g. an EVA copolymer), and may have an activation temperature of about 100° C. to about 120° C., and in some implementations about 90° C. to about 120° (e.g. about 104° C.).

In some implementations, the first and second outer thermosetting or thermoplastic adhesive layers and/or the first and second intermediate thermosetting or thermoplastic adhesive layers may comprise the same on or different ones of:
  polyester;
  acrylic; and,
  urethane.

In one approach, each of such layers may comprise the same thermoplastic adhesive that is printable on the corresponding, respective first or second support layer. As noted, the first thermoplastic adhesive layer and the second thermoplastic adhesive layer may be provided between the core layer and the first support layer, and between the core layer and the second support layer, by a number of different approaches. In one approach, the first thermoplastic layer may be supportably disposed (e.g. extruded) on to the first side of the core layer and/or the second thermoplastic layer may be supportably disposed (e.g. extruded) on to the second side of the core layer, for handling together prior to interconnection of the core layer, first support layer and second support layer. In another approach, the first thermoplastic adhesive layer may be supportably disposed (e.g. extruded) on to the inward-facing side of the first support layer for handling together prior to interconnection of the core layer, first support layer and second support layer and/or the second thermoplastic adhesive layer may be supportably disposed (e.g. extruded) on to the inward-facing side of the second support layer for handling together prior to interconnection of the core layer, first support layer and second support layer.

In yet another approach, the first thermoplastic adhesive layer may be supportably disposed on one or both sides of a polymer-based first carrier layer that is separately positionable between the core layer and first support layer prior to interconnection of the core layer, first support layer and second support layer. Additionally, or alternatively, the second thermoplastic adhesive layer may be supportably disposed on one or both sides of a polymer-based second carrier layer that is separately positionable between the core layer and second support layer prior to interconnection of the core layer, first support layer and second support layer.

In some embodiments, the laminated card may further include a first print layer printed on one of an inward-facing side and an outward-facing side of the first support layer. In such embodiments, the first support layer may have a thickness of at least about 18% of a total thickness of the laminated card. The first print layer may comprise one or more of graphics (e.g. a pictorial scene, a logo, a photo, etc.), human-readable characters (e.g. numbers, letters, and/or representations thereof), and/or machine-readable markings (e.g. a bar code, a multi-dimensional matrix code, etc.). In some embodiments (e.g. when the first print layer is printed on an outward-facing side of the first support layer), the laminated card may further include a polymer-based, transparent first overlaminate layer (e.g. overlying the first print layer) interconnected to the outward-facing side of the first support layer. In the later regard, the first overlaminate layer may be provided with a polymer-based, optionally transparent, first outer thermosetting adhesive layer, or alternatively a polymer-based, optionally transparent, first outer thermoplastic adhesive layer, supportably disposed on an inward-facing side thereof for handling together during separate positioning relative to the first support layer prior to interconnection of the core layer, first support layer and second support layer. The first outer thermosetting adhesive layer or first outer thermoplastic adhesive layer may have an activation temperature of no more than about 130° C., and in contemplated embodiments no more than about 120° C. (e.g. about 90° C. to about 120° C.).

In some embodiments, the laminated card may further include a second print layer printed onto or coupled to one of an inward-facing side and an outward-facing side of the second support layer. In such embodiments, the second support layer may have a thickness of at least about 18% of a total thickness of the laminated card. The second print layer may comprise one or more of graphics (e.g. a pictorial scene, a logo, a photo, etc.), human-readable characters (e.g. numbers, letters, and/or representations thereof), and/or machine-readable markings (e.g. a bar code, a multi-dimensional matrix code, etc.). In some embodiments (e.g. when the second print layer is printed on an outward-facing side of the second support layer), the laminated card may further include a polymer-based, transparent second overlaminate layer (e.g. overlying the second print layer) interconnected to the outward-facing side of the second support layer. In the later regard, the second overlaminate layer may be provided with a polymer-based, optionally transparent, second outer thermosetting adhesive layer supportably, or alternatively a polymer-based, optionally transparent, second outer thermoplastic adhesive layer, disposed on an inward-facing side thereof for handling together during separate positioning relative to the second support layer prior to interconnection of the core layer, first support layer and second support layer. The second outer thermosetting adhesive layer or second outer thermoplastic adhesive layer may have an activation temperature of no more than about 130° C., and in contemplated embodiments no more than about 120° C. (e.g. about 90° C. to about 120° C.).

In various embodiments, the human-readable account indicia may be indicative of or associable with a payment account to be administered by an issuer of a payment card (e.g. a payment account administered by a financial institution such as a bank or credit union), a membership account, a loyalty account, etc. The human-readable account indicia may be defined by one or more of the following:

laser engraving;
    ink-jet printing;
    thermal-printing (e.g., on a patch or overlaminate layer); and,
    embossing.

In one approach, the human-readable account indicia may be defined by embossed characters through the entire thickness of the laminated card, and in substantial compliance with ISO/IEC Standard 7811-1. In another approach the human-readable account indicia may be defined by laser engraving the first overlaminate layer.

In contemplated embodiments, the laminated card may comprise a pocket defined in a first outer side of the laminated card. In some implementations, the pocket may include a central inner portion that extends entirely through the first support layer and in to the core layer, and an annular outer portion that pocket extends in to the first support layer to a depth less than a thickness thereof to define an annular seat in the pocket. In turn, the laminated card may also include an integrated circuit chip supported on a downward-facing side of a substrate and a plurality of contact pads supported on an upward-facing side of the substrate for contact signal communications with a contact chip card reader, wherein the integrated circuit chip is disposed within the central inner portion of the pocket and an outer annular portion of the downward-facing side of the substrate is adhesively interconnected to and supported by the annular seat in the pocket. As may be appreciated, the contact pads may be provided for electrical contact interface with a contact chip card reader (e.g. provided in compliance with ISO/IEC Standard 7816).

In some implementations, the laminated card may include an antenna and an operatively interconnected integrated circuit chip for contactless signal communications with a contactless chip card reader (e.g. provided in compliance with ISO/IES Standard 14443). As noted above, in one approach, the antenna may be located on the first side of the core layer as part of an inlay. In turn, the antenna may be electrically coupled to an integrated circuit chip disposed in a pocket defined in a first outer side of the laminated card, as described above. In that regard, the integrated circuit chip may be supported on a downward-facing side of a substrate, wherein the integrated circuit chip is disposed within the central inner portion of the pocket and an outer annular portion of the downward-facing side of the substrate is adhesively interconnected to and supported by the annular seat in the pocket. The antenna may be directly connected to the integrated circuit chip via connections provided on the downward-facing side of the substrate, or the antenna may include a coupling portion for inductive coupling with an coupling antenna that is supported on the downward-facing side of the substrate in the outer annular portion thereof and electrically interconnected to the integrated circuit chip thereof.

In conjunction with such embodiments, a plurality of contact pads may be supported on an upward-facing side of the substrate for contact signal communications with a contact chip card reader, thereby providing a dual-interface card. As may be appreciated, the contact pads may be provided for electrical contact interface with a contact chip card reader (e.g. provided in compliance with ISO/IEC Standard 7816).

In another approach, the antenna may be supportably connected to a carrier layer that is located between the first side of the core layer and the first support layer. The carrier layer may have the first thermoplastic adhesive layer supportably disposed thereupon and the first support layer may have a thermoplastic adhesive layer or thermosetting adhesive layer disposed thereupon. In some implementations, the antenna may be electrically interconnected to an integrated circuit chip, supportably connected to the carrier layer, for contactless signal communications with a contactless chip card reader (e.g. provided in compliance with ISO/IES Standard 14443). In such implementations, the laminated card may be provided with no visible integrated circuit chip. In other implementations, the antenna may be electrically coupled to an integrated circuit chip disposed in a pocket defined in a first outer side of the laminated card, as described above. In that regard, the integrated circuit chip may be supported on a downward-facing side of a substrate, wherein the integrated circuit chip is disposed within the central inner portion of the pocket and an outer annular portion of the downward-facing side of the substrate is adhesively interconnected to and supported by the annular seat in the pocket. The antenna may be directly connected to the integrated circuit chip via connections provided on the downward-facing side of the substrate, or the antenna may include a coupling portion for inductive coupling with an coupling antenna that is supported on the downward-facing side of the substrate in the outer annular portion thereof and electrically interconnected to the integrated circuit chip thereof. In conjunction with such embodiments, a plurality of contact pads may be supported on an upward-facing side of the substrate for contact signal communications with a contact chip card reader, thereby providing a dual-interface card. As may be appreciated, the contact pads may be provided for electrical contact interface with a contact chip card reader (e.g. provided in compliance with ISO/IEC Standard 7816).

In some embodiments, the transaction card may further comprise a magnetic stripe (e.g. provided in compliance with ISO/IEC Standard 7811) for storing encoded data associated with the account indicated by or otherwise associated with the visible indicia (e.g. "personalization data"). By way of example, the magnetic stripe may be interconnected to a second side of the transaction card, opposite to the first side thereof. In particular, the magnetic stripe may be affixed (e.g. via a heat transfer process, a cold peel process, or an adhesive mount process) to an outward-facing surface of a second overlaminate layer of the transaction card. In some implementations, a signature panel may also be affixed (e.g. hot-stamped) to an outward-facing surface of a second overlaminate layer. Further, a hologram and/or elite brand mark (e.g. indicative of a specific payment network or card association) may be affixed (e.g. hot-stamped) on an outward-facing surface of a first overlaminate layer and/or second overlaminate layer of the laminate card.

In additional embodiments, a method for producing a laminated card having any of the features of the laminated card described herein may entail arranging a plurality of card layers that includes a core layer comprising at least about 70%, and typically at least about 90%, post-consumer and/or post-industrial polyethylene by weight, and having a thickness of at least about 15%, and typically at least about 30%, of a total thickness of the laminated card, a polymer-based first support layer having an inward-facing side thereof facing a first side of the core layer with a first thermoplastic adhesive layer disposed therebetween, and a polymer-based second support layer having an inward-facing side thereof facing a second side of the core layer with a second thermoplastic adhesive layer disposed therebetween. The first support layer may have a thickness of at least about 12%, and in some cases at least about 15% or even 18%, of a total thickness of the laminated card, and the second support layer may have a thickness of at least about 12%, and in some cases at least about 15% or even 18%, of a total thickness of the laminated card.

In some embodiments, the arranging of the plurality of card layers may further include a first carrier layer located between the first support layer and the core layer and having the first thermoplastic adhesive layer supportably disposed on an inward-facing side thereof and/or a second carrier layer located between the second support layer and the core layer and having the second thermoplastic adhesive layer supportably disposed on an inward-facing side thereof. In turn, the plurality of card layers may further include a first intermediate thermoplastic or thermosetting adhesive layer supportably disposed on an inward-facing side of the first support layer and/or a second intermediate thermoplastic or thermosetting adhesive layer supportably disposed on an inward-facing side of the second support layer.

The method may further include laminating the plurality of card layers by applying heat and pressure to an outward-facing side of said first support layer and to an outward-facing side of said second support layer to activate the first thermoplastic adhesive layer and the second thermoplastic adhesive layer, and when utilized the first and second intermediate thermoplastic or thermosetting adhesive layers, to interconnect the plurality of card layers. After the laminating, the method may include defining visible human-readable account indicia at an outer surface of one of a first side and a second side of the laminated card. Additionally, or alternatively, the method may include one or more steps to provide the laminated card with machine-readable functionality to facilitate association of the laminated card with an account maintained by a given card issuer. Such functionality may include the provision of contact and/or contactless chip card features to facilitate signal interface with contact and/or contactless chip card readers, respectively, as described herein.

In some implementations, the first and second support layers may each have a tensile strength that is greater than a tensile strength of the core layer, and in some cases at least about 30% or even at least about 50% greater. In some arrangements, the first and second support layers may have corresponding tensile strengths of at least about 30 N/mm² (ASTM Standard D-882), and in some cases at least about 40 N/mm² (ASTM Standard D-882), and the core layer may have a tensile strength of at least about 20 N/mm² (ASTM Standard D-882), and in some cases at least about 25 N/mm² (ASTM Standard D-882). In conjunction with such embodiments, the first and second thermoplastic adhesive layers, and if included the first and second intermediate thermoplastic or thermosetting adhesive layers, may have corresponding tensile strengths that are greater than the tensile strengths of the core layer and first and second support layers.

In the various embodiments, the laminated card may define a length and a width, with the core layer, first support layer and second support layer each having the same length and width, and each having a corresponding constant thickness across the length and width thereof. In that regard, peripheral edges of each of the core layer and the first and second support layers may extend continuously about the entire periphery of the transaction card. In typical arrangements, the length, width and thickness of the laminated card may be substantially compliant with ISO/IEC Standard 7810.

In contemplated embodiments, the laminating step may include heating the plurality of card layers to obtain a temperature across the plurality of card layers that is equal to or greater than an activation temperature of the first thermoplastic adhesive layer and an activation temperature of the second thermoplastic adhesive layer, and when utilized the first and second intermediate thermoplastic or thermosetting adhesive layers, and less than melting point temperatures of the first support layer, the second support layer, the core layer, and when utilized the first and second carrier layers. In some implementations, the first thermoplastic adhesive layer and the second thermoplastic adhesive layer, and when utilized the first and second intermediate thermoplastic or thermosetting adhesive layers, may each have corresponding activation temperatures of no more than about 130° C., or no more than about 120° C. (e.g. about 90° C. to about 120° C.), and the melting point temperatures corresponding with the core layer and first and second support layers, and when included the first and second carrier layers, may be greater than about 130° C., and in contemplated embodiments greater than about 135° C. In turn, the heating may be provided to activate the first and second thermoplastic adhesive layers, and when included the first and second intermediate thermoplastic or thermosetting adhesive layers, for bonded interconnection of the core layer to the first and second support layers, substantially free from varying the relative positions of the core layer and first and second support layers. In conjunction with such implementations, the first support layer and the second support layer may have corresponding Vicat softening temperatures of at least about 80° C. (ISO/IEC Standard D-1525A), and the core layer may have a Vicat softening temperature of at least about 110° C. (ISO/IEC Standard D-1525A), and in some cases at least about 120° C. (ISO/IEC Standard D-1525A).

In some embodiments, the laminating may include heating the plurality of card layers to obtain a temperature of at least about 85 C, and no more than about 120° C., and in some cases no more than about 135° C. (e.g. about 90° to about 130° C.), across the plurality of card layers, wherein a pressure of about 0.55 N/mm² to about 0.83 N/mm² (e.g. about 0.67 N mm²), and no greater than about 0.90 N/mm², is applied across the plurality of card layers during the heating (e.g. for a total duration of about 10 minutes to about 30 minutes). Further, after the heating step and before the defining step, the laminating may include cooling the plurality of card layers (e.g. to obtain a temperature of no more than about 32° C. to about room temperature across the plurality of card layers), wherein an increasing stepped-up pressure is applied across the plurality of card layers during the cooling. For example, during the cooling step the applied pressure may be increased in steps, starting from about 0.55 N/mm² to about 0.83 N/mm², and increasing to at least about 1.0 N/mm².

In some embodiments, prior to the arranging, the method may include pre-laminating a plurality of inlay or base layers that includes the core layer between the polymer-based first carrier layer located on the first side of the core layer and the polymer-based second carrier layer located on the second side of the core layer to define an interconnected inlay, wherein the first thermoplastic adhesive layer is provided between the first side of core layer and first carrier layer (e.g. preconnected to the first carrier layer) and the second thermoplastic adhesive layer is provided between the second side of the core layer and second carrier layer (e.g. preconnected to the second carrier layer). In turn, the inlay may be provided for inclusion in the arranging and laminating. In some embodiments, the inlay may also include an antenna, and optionally an integrated circuit chip operatively connected to the antenna, located on the core layer (e.g. supportably located on the first side thereof) prior to the pre-laminating, between the core layer and the first carrier layer, to facilitate contactless card functionalities (e.g. contactless only and/or dual interface card functionality).

The pre-laminating may include heating the plurality of inlay layers to obtain a temperature across the plurality of inlay layers that is equal to or greater than an activation temperature of the first thermoplastic adhesive layer and an activation temperature of the second thermoplastic adhesive layer, and less than melting point temperatures of the core layer and the first carrier layer and second carrier layer, to obtain a temperature of no more than about 120° C. or no more than about 135° C. (e.g. about 90° C. to about 130° C.), across the plurality of inlay layers, wherein a pressure of about 0.55 N/mm² to 0.83 N/mm², and no greater than about 0.90 N/mm², is applied across the plurality of inlay layers during the heating (e.g. for a total duration of about 10 minutes to about 30 minutes). In some implementations, the first thermoplastic adhesive layer and the second thermoplastic adhesive layer may each have corresponding activation temperatures of no more than about 130° C., or no more than about 120° C. (e.g. about 90° C. to about 120° C.), and the melting point temperatures corresponding with the core layer and first and second carrier layers may be greater than about 130° C., and in contemplated embodiments greater than about 135° C. After the heating, the pre-laminating may include cooling the plurality of inlay layers while applying a pressure of about 0.55 N/mm² to 0.83 N/mm², and no greater than about 0.90 N/mm², across the plurality of inlay layers (e.g. for a duration of up to about 4 minutes) and then while applying a pressure of at least about 1.0 N/mm² across the plurality of inlay layers (e.g. for a total duration of about 10 minutes to about 30 minutes).

In some implementations, the method may include treating the first side and/or the second side of the core layer (e.g. via corona, electron beam, flame and/or primer treatment) to provide a surface energy of at least about 34 dyne, and preferably at least about 40 dyne or even 58 dyne, thereby facilitating bonding with the first and second thermoplastic adhesive layers. In one approach, the first side and/or second side of the core layer may have a surface energy of about 58 dyne. Relatedly, the method may include treating the inward-facing side and/or an outward-facing side of the first support layer and/or the second support layer (e.g. via corona, electron beam, flame and/or primer treatment) to provide a surface energy of at least about 30 dyne.

In some embodiments, the first support layer and/or the second support layer, and when utilized the first carrier layer and/or the second carrier layer, may comprise the same one or different ones of:
polyvinyl chloride;
polyethylene terephthalate glycol;
polyethylene terephthalate; and,
polycarbonate.

In one approach, the first and second support layers may each comprise the same polymer. In some embodiments, at least a portion or all of the first support layer and/or the second support layer may comprise either virgin or recycled polymer(s). In the later regard, the laminated card may comprise a core layer and first and second support layers that cumulatively comprise post-consumer and/or post-industrial polymer(s) in an amount corresponding with at least about 90%, or even about 99%, of a total weight of the laminated card. Further, the first carrier layer and the second carrier layer may comprise the same polymer, which may be the same or different than the polymer comprising the first layer and/or second layer.

In some embodiments, the post-consumer polyethylene of the core layer may comprise at least about 50% by weight, and typically at least about 90% or even 99% by weight, recovered ocean-bound plastic waste. Further, the core layer may be provided to have a density of at least about 0.9 g/cm$^3$.

In various embodiments, the first support layer and/or the second support layer, and if utilized the first carrier layer and/or the second carrier layer, may be opaque, translucent or transparent, and may be colorized. Additionally or alternatively, the core layer may be colorized.

In various embodiments, the first thermoplastic adhesive layer and the second thermoplastic adhesive layer may comprise the same one or different ones of:
ethylene vinyl acetate;
acrylic; and,
urethane.

In one approach, the first and second thermoplastic adhesive layers may each comprise ethylene vinyl acetate (e.g. an EVA copolymer), and may each have an activation temperature of about 100° C. to about 120° C., and in some implementations about 90° C. to about 120°. In some implementations, the first and second outer thermosetting or thermoplastic layers 54, 56, and/or the first and second intermediate thermosetting or thermoplastic layers may comprise the same on or different ones of:
polyester;
acrylic; and,
urethane.

In contemplated embodiments, the method may further include, prior to the arranging, printing a first print layer on at least one of the inward-facing side and an outward-facing side of the first support layer, wherein the printing is visible on the first side of the transaction card. The first print layer may comprise one or more of graphics (e.g. a pictorial scene, a logo, a photo, etc.), human-readable characters (e.g. numbers, letters, and/or representations thereof), and/or machine-readable markings (e.g. a bar code, a multi-dimensional matrix code, etc.).

In some embodiments, the arranging step may further include locating a transparent first overlaminate layer in overlying relation to an outward-facing side of the first support layer, e.g. overlying the first print layer, as one of the plurality of card layers. The first overlaminate layer may be provided with a first outer thermosetting adhesive layer, or first outer thermoplastic adhesive layer, supportably disposed on an inward-facing side thereof for handling together during the locating, wherein the first outer thermosetting adhesive layer or first outer thermoplastic adhesive layer may be activated during the connecting step for interconnection of the first overlaminate layer to the outward-facing side of the first support layer.

In some embodiments, the method may further include, prior to the arranging, printing a second print layer on at least one of the inward-facing side and an outward-facing side of the second support layer, wherein the printing is visible on the second side of the transaction card. The second print layer may comprise one or more of graphics (e.g. a pictorial scene, a logo, a photo, etc.), human-readable characters (e.g. numbers, letters, and/or representations thereof), and/or machine-readable markings (e.g. a bar code, a multi-dimensional matrix code, etc.).

In some embodiments, the arranging may further include locating a transparent second overlaminate layer in overlying relation to an outward-facing side of the second support layer, e.g. overlying the second print layer, as one of the plurality of card layers. The second overlaminate layer may be provided with a second outer thermosetting adhesive layer, or second outer thermoplastic adhesive layer, supportably disposed on an inward-facing side thereof for handling together during the locating, wherein the second outer thermosetting adhesive layer or second outer thermoplastic adhesive layer may be activated during the laminating step for interconnection of the second overlaminate layer to the outward-facing side of the second support layer.

In contemplated embodiments, the defining may comprise one or more of:
laser engraving;
ink-jet printing;
thermo-printing (e.g., on a patch or overlaminate layer); and,
embossing.

In implementations utilizing embossing, the first and second support layers may function to maintain embossed characters providing the human-readable account indicia, in substantial compliance with ISO/IEC Standard 7811-1.

In some implementation, after the laminating step and prior to the defining step, the method may further include forming a pocket in a first outer side of the laminated card, a central inner portion of the pocket extending entirely through the first support layer and the core layer, and an annular outer portion of the pocket extending in to the first support layer to a depth less than a thickness thereof and defining an annular seat in the pocket. In turn, the method may include locating an integrated circuit chip supported on a downward-facing side of a substrate and a plurality of contact pads supported on an upward-facing side of the substrate in the pocket, the integrated circuit chip being disposed within the central inner portion of the pocket and an outer annular portion of the downward-facing side of the substrate being adhesively interconnected to and supported by the annular seat in the pocket.

In some arrangements, prior to the arranging step, the method may further comprise affixing a magnetic stripe to one of the first side of the laminated card and the second of the laminated card. In particular, the magnetic stripe may be affixed (e.g. via a heat transfer process, a cold peel process, or an adhesive mount process) to an outward-facing surface of a second overlaminate layer of the transaction card.

In contemplated method embodiments, the laminated card is one of a plurality of transaction cards, wherein the method comprises collating a plurality of sheets in a multi-sheet assembly to complete the arranging for each of said plurality of cards, the multi-sheet assembly including:

a core sheet (e.g. comprising at least about 70%, and typically at least about 90%,
  post consumer polyethylene by weight, and having a thickness of at least about 15%, and typically about at least 30%, of a total thickness of the multi-sheet assembly);
  a polymer-based first support sheet having an inward-facing side thereof facing a first side of the core sheet with a first thermoplastic adhesive disposed therebetween (e.g. the first support sheet having a thickness of at least about 12% of total thickness of the multi-sheet assembly); and,
  a polymer-based second support sheet having an inward-facing side thereof facing a second side of the core sheet with a second thermoplastic adhesive disposed therebetween (e.g. the second support sheet having a thickness of at least about 12% of a total thickness of the multi-sheet assembly). In turn, the method may include laminating the multi-sheet assembly in a laminating device to complete the applying for each of said plurality of cards, and separating, after said laminating and prior to said defining, a plurality of card bodies from a corresponding plurality of sheet regions of the multi-sheet assembly in corresponding relation to said plurality of transaction cards.

In some embodiments, prior to the collating, the method may include completion of the pre-laminating step for each of the plurality of cards by pre-lamination of a plurality of inlay sheets that includes the core sheet located between a first carrier sheet having a first thermoplastic adhesive sheet layer supported on an inward-facing side thereof and a second carrier sheet having a second thermoplastic adhesive sheet layer supported on an inward-facing side thereof. Prior to such prelamination, the method may include supportably locating a plurality of antennas on the core sheet in a plurality of regions that correspond with the plurality of regions of the multi-sheet assembly.

Numerous additional features and advantages of the present invention will become apparent to those skilled in the art upon consideration of the embodiment descriptions provided hereinbelow.

DETAILED DESCRIPTION

Figure 1:
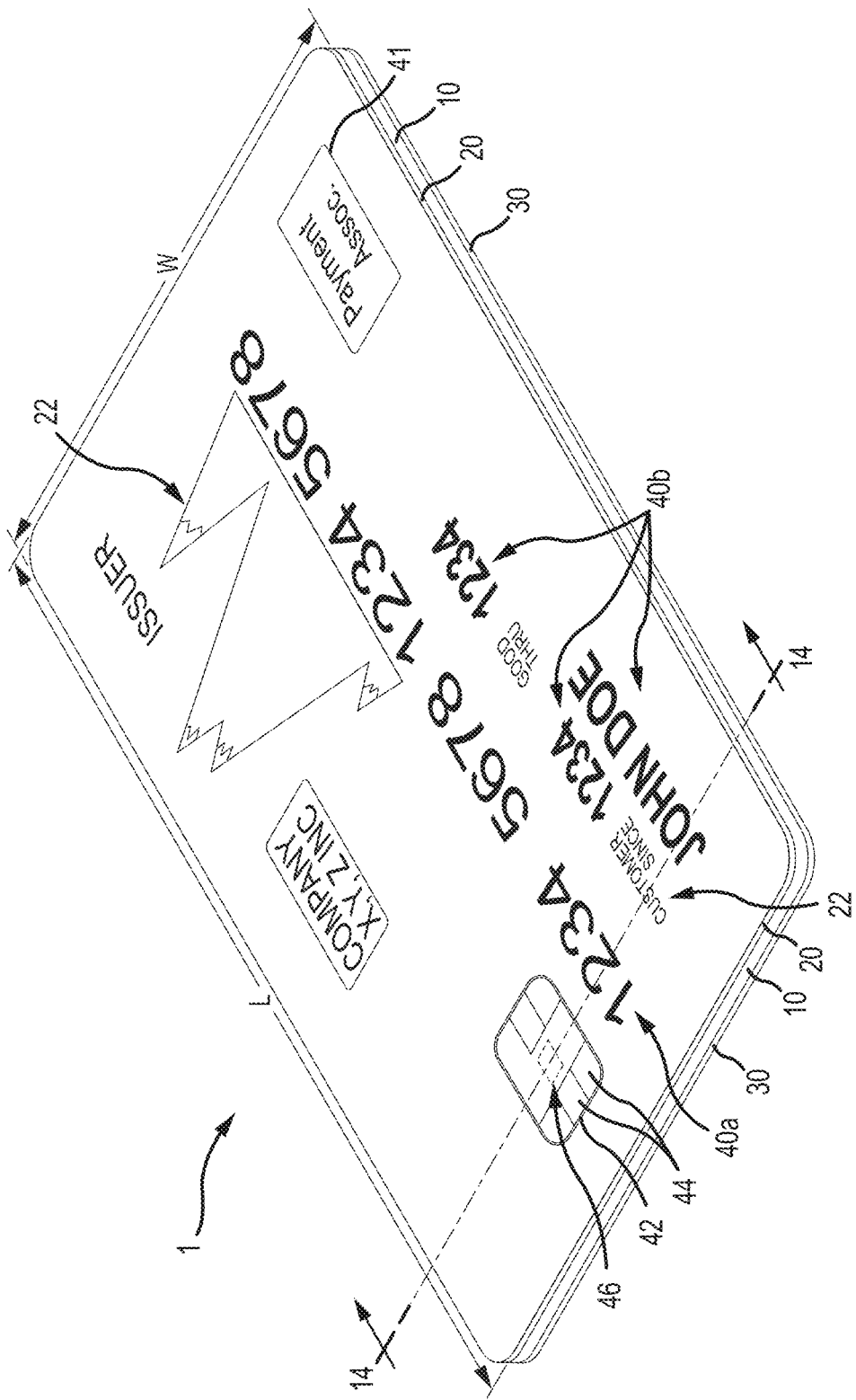
FIG. 1 is a front perspective view of one embodiment of a transaction card.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The present disclosure is related generally to transaction cards, such as laminated cards, that may include indicia or data that can be used as part of a financial transaction (e.g., credit card) or other types of transactions and actions. The transaction card includes post-consumer and/or postindustrial polyethylene, or other types of polyethylene. Conventionally, these materials have not been used for transaction cards or laminated card products, given the many issues they present with respect to manufacturing, durability, and the like. For example, post-consumer polyethylene is a more flexible than other more commonly used materials for transaction cards, such as polyvinyl chloride (PVC), and due to such flexibility is difficult to run through various manufacturing machines, such as printers and laminators generally required to fabricate a transaction card. For example, the flexibility may cause the material to bend, move, and fold, preventing threading through rollers or other manufacturing machines. While increasing the thickness of the polyethylene, such as above 30 mil, may help in reducing some of the flexibility, increases in the core layer, can result in the overall thickness of the card being too thick to meet financial transaction card standards, such as the ISO standards.

Polyethylene also contracts significantly after heating as it is softer than more conventional material. This means that often the material will shrink after a heated lamination process, causing the frequency of embedded antennas to change significantly during production, which can render the final transaction cards unusable. The softness of polyethylene also can cause cards made from post-consumer polyethylene to lose embossing height over time, removing or making data, such as consumer account information, unreadable or unclear or causing embossing to fall below the ISO embossing height requirement (e.g., ISO Standard 7813). Further, bonding of other layers, such as graphic overlays and the like, that are typically used with laminated transaction cards, is difficult with polyethylene due to its chemical composition and the like, and in many instances if a bond is possible, the lamination will fail rapidly, causing the layers to peel off and disconnect. Additionally, many adhesives commonly used to bond PVC do not bond well to polyethylene or are difficult to use in lamination processing methods. Further, forming additional card layers from recycled or post-consumer materials may increase the recycled content description but may present additional challenges due to inconsistencies in recycled materials, structural weaknesses, and the like.

Post-consumer plastic may include, for example, recovered ocean bound plastic, or other plastic materials that have been previously formed and used for other purposes, i.e., are no longer virgin materials. Post-consumer plastic may be re-formed, melted, or otherwise processed into sheets or other shapes for use in transaction cards. In some implementations, processing of post-consumer plastic may include removal of impurities, addition of some amount of virgin material to the post-consumer material, or addition or removal of pigmentation to the post-consumer material.

The present disclosure includes techniques and structures that allow the use of polyethylene for transaction cards, including post-consumer or post-industrial polyethylene. For example, a "sandwich" or layered construction where a core layer including post-consumer and/or post-industrial polyethylene is interconnected by first and second adhesive layers to corresponding first and second support layers (positioned on opposing sides of the core layer). The support layers are coupled to the core via the adhesives and may be more rigid and provide structural support, allowing the production of a laminated card having ISO standard mechanical properties, while also providing environmental-related benefits and cost efficiencies. Given the large quantities of payment cards (e.g. credit, debit, and stored value cards), membership cards, loyalty cards, identification cards, premises access cards, and other wallet-sized cards deployed globally on an annual basis, the disclosed embodiments are able to allow the recycling or reuse of post-consumer HDPE, and in particular, recovered ocean-bound plastic waste, by incorporating such materials into transaction cards. Also, the present disclosure includes processes and materials that allow the connection of the core polyethylene layer to the support layers, such that the layers can be strongly bonded together during a laminating process, not possible with conventional lamination processes and materials, where such materials do not bond to polyethylene.

In some embodiments, additional aesthetic elements, such as a metal "foil" or metalized layer may be included in the prelam and/or completed laminated card. The metalized layer may be aligned with transparent overlays or partially transparent overlay layers so as to be at least partially visible from the exterior of the laminated card. The metalized layer may enhance the aesthetics of the laminated card. The techniques described herein allow the metalized layer to bond with and be used in laminated cards including post-consumer plastic.

Figure 2:
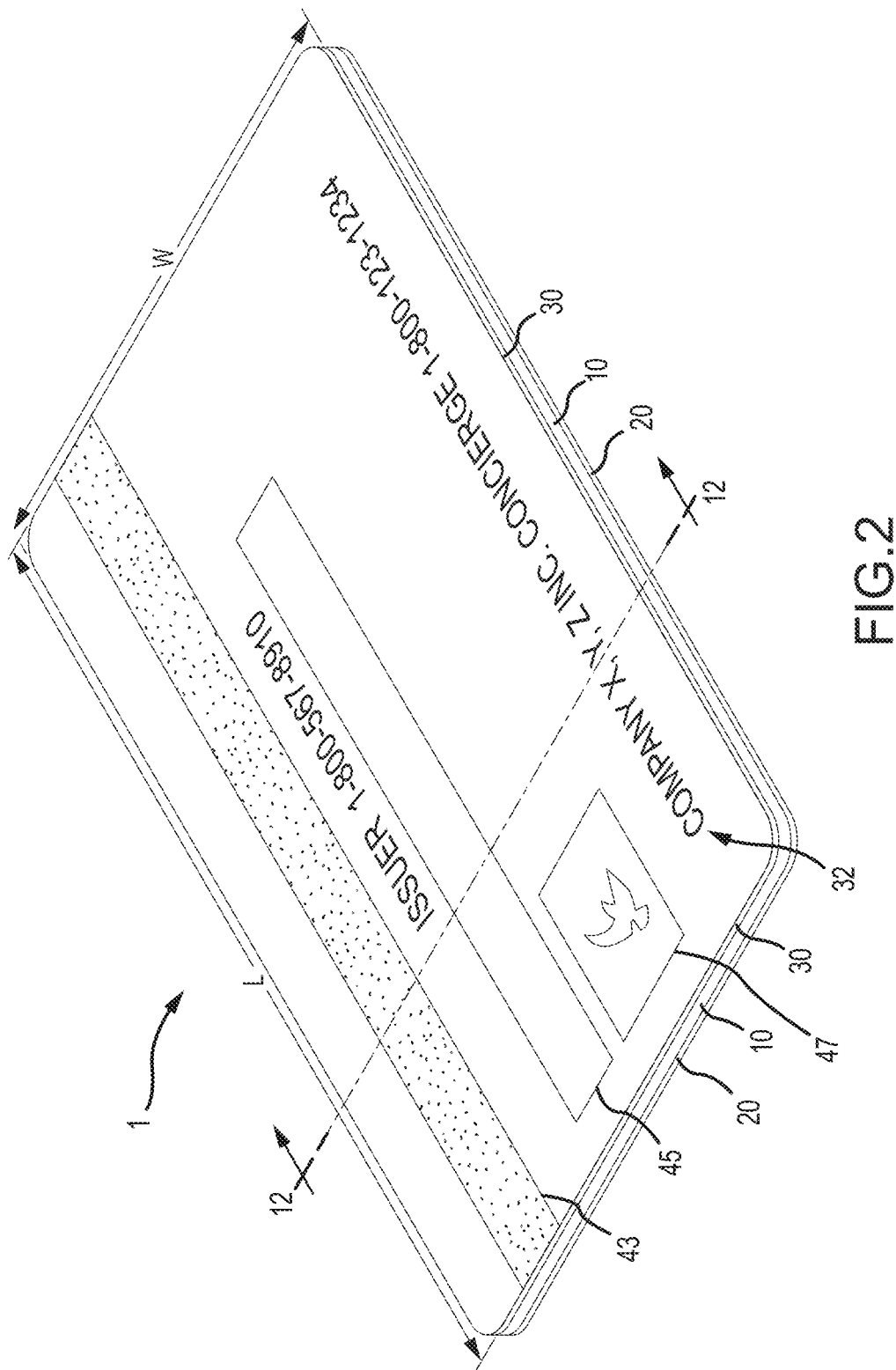
FIG. 2 is a back perspective view of the embodiment shown in FIG. 1.

Turning to the figures, FIGS. 1 and 2 illustrate one embodiment of a transaction card 1 having a length and a width (e.g. a length, width and thickness in compliance with ISO/IEC Standards 7810). The transaction card 1, which may be a laminated card 1, is generally formed of a stack of materials with the same length and width as the laminated card 1 that, combined, form the thickness of the laminated card 1. The laminated card 1 includes a core layer 10 comprising polyethylene, such as post-consumer and/or post-industrial polyethylene, or other polyethylene source, and extending from across a length L and a width W of the laminated card 1. The core layer 10 may form or define a substrate for the transaction card, onto which additional layers or structures are connected.

The laminated card 1 includes a first support layer 20 interconnected by a first adhesive layer to a first side of the core layer 10 and extending from across the length L and the width W of the laminated card 1, and a second support layer 30 interconnected by a second adhesive layer to a second side of the core layer 10 and extending from across the length L and the width W of the laminated card 1. The support layers 20, 30 may provide additional rigidity and structure for the laminated card 1 and generally may be formed of different materials from the core layer of polyethylene, such as a vinyl material (e.g., polyvinyl chloride) or other types of polyethylene (e.g., polyethylene terephthalate glycol or PET-G), as compared to a polyethylene, forming the core. In various implementations, materials forming the support layers 20, 30 may be virgin or recycled materials. In some embodiments, the support layers 20, 30 are coupled to the core layer and provide structural support and rigidity, assisting the core layer 10 during manufacturing and lamination processes.

With reference again to FIG. 1, the core layer 10 may comprise at least about 70%, and typically at least about 90%, post-consumer polyethylene by weight of the core layer 10. Further, the core layer 10 may have a thickness of at least about 15%, and typically at least about 30%, of a total thickness of the laminated card 1. The post-consumer polyethylene of the core layer may comprise at least about 50% by weight, and typically at least about 90% or even 99% by weight, recovered ocean-bound plastic waste. Further, the core layer 10 may be provided to have a density of at least about 0.9 g/cm$^3$. Although, in other variations, different percentages may be achieved or desired.

The first support layer 20 may have a thickness of at least about 12%, and in some cases at least about 15% or even about 18%, of a total thickness of the laminated card. The second support layer 30 may have a thickness of at least about 12%, and in some cases at least about 15% or even 18%, of a total thickness of the laminated card. The thicknesses presented are illustrative and may be varied as desired depending, for example, on the end use or purpose of the card.

The first and second support layers 20, 30 may each have a tensile strength that is greater than a tensile strength of the core layer 10, and in some cases at least about 30% or even at least about 50% greater. In some arrangements, the first and second support layers 20, 30 may have corresponding tensile strengths of at least about 30 N/mm² (ASTM Standard D-882), and in some cases at least about 40 N/mm² (ASTM Standard D-882), and the core layer may have a tensile strength of at least about 20 N/mm² (ASTM Standard D-882), and in some cases at least about 25 N/mm² (ASTM Standard D-882). In conjunction with such embodiments, the first and second thermoplastic adhesive layers may have corresponding tensile strengths that are greater than the tensile strengths of the core layer 10 and first and second support layers 20, 30. Additionally, the first and second support layers 20, 30 may have a rigidity greater than the rigidity of the core 10, so as to provide both strength and reduced flexibility for the card 1.

As shown in FIG. 1, a first print layer 22 may be printed on the first support layer 20 (or may be coupled to the support layer 20), where at least a portion of first print layer 22 may be visible from a first side of the laminated card 1. For example, the first print layer 22 may be reverse-printed on an inward-facing side of a transparent first support layer 20 and/or the first print layer 22 may be forward-printed on an outward-facing side of a transparent or opaque first support layer 20.

As shown in FIG. 2, a second print layer 32 may be printed on the second support layer 30 or coupled to the second support layer 30, where at least a portion of second print layer 32 may be visible from a second side of the laminated card 1. For example, the second print layer 32 may be reverse-printed on an inward-facing side of a transparent second support layer 30 and/or the second print layer 32 may be forward-printed on an outward-facing side of second support layer 30.

Figure 17:
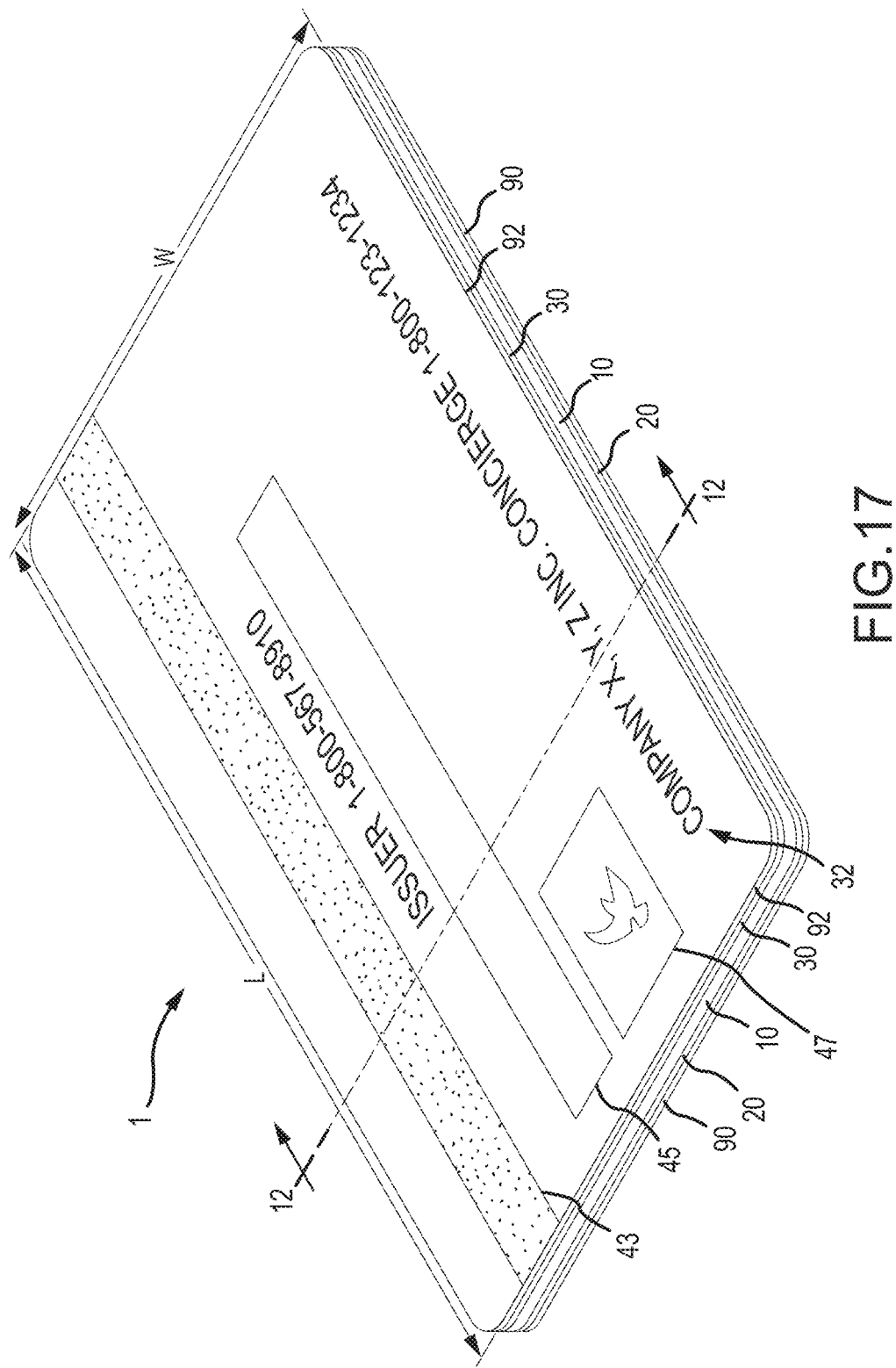
FIG. 17 is a back perspective view of one embodiment of a transaction card.

As shown in FIG. 17, in some implementations, a second metal layer 92 may be deposited on the second support layer 30 or coupled to the second support layer 30, where at least a portion of the second metal layer 92 may be visible from the second side of a laminated card 2. In these implementations, the second print layer 32 may be forward-printed over the metal layer 92 on the outward facing side of the second support layer 30, such that the second print layer 32 may be visible from the second side of the laminated card 2. Such implementations may also include a first metal layer 90 deposited on the first support layer 20 or coupled to the first support layer 20, where at least a portion of the first metal layer 90 may be visible from the first side of the laminated card 2. Similarly, in these implementations, the first print layer 22 may be forward printed over the first metal layer 90 such that the first print layer 22 is visible from first side of the laminated card 2. For example, overlaminate layers (e.g., layers 60 and 62 of FIG. 18) may be partially transparent or fully transparent so that the first print layer 22, the second print layer 32, the first metal layer 90, and the second metal layer 92 may be fully or partially visible through the overlaminate layers.

The first metal layer 90 and the second metal layer 92 may comprise any type of metal or alloy such as aluminum, gold, or another metal that can be bonded or vacuum deposited on the first support layer 20 and the second support layer 30. The materials may be recycled or virgin, depending on the implementation. In some implementations, recycled materials may include impurities, making recycled materials more difficult to use with a standardized manufacturing process. The laminated card 2 may include any features described with respect to the laminated card 1 such as embedded chips, antenna, etc.

The first print layer 22 and second print layer 32 may comprise one or more of graphics (e.g. a pictorial scene, a logo, etc.), human-readable characters (e.g. numbers, letters, and/or representations thereof), and/or one or more machine-readable markings (e.g. a bar code, a multi-dimensional matrix code, etc.). The first print layer 22 and/or second print layer 32 may be ink-based, and the first support layer 20 and/or second support layer 30 may be opaque and/or at least partially translucent and/or at least partially transparent, as viewed from the first side and second side of the laminated card 1, respectively. Further, whether opaque and/or translucent, the first print layer 22 and/or second print layer 32 may be colorized to yield a wide range of visual effects to enhance the possibilities for card differentiation.

The first print layer 22 and the second print layer 32 may be separately defined by one or more of the following printing processes:
  lithographic printing;
  Gravure printing;
  silk-screen printing;
  digital printing; and,
  ink-jet printing.

The first print layer 22 and/or second print layer 14 may each comprise a plurality of separately-printed inks, each of which are separately printed by one of the referenced printing processes. In that regard, different ones of the referenced printing processes may be employed for different ones of the plurality of separately-printed inks. In some arrangements, the plurality of separately-printed inks comprise one or more of a plurality of different-colored inks, each containing a different pigment or dye. Relatedly, the printer layers 14, 22 may be directly printed onto the support layers 20, 30 or may be printed onto a carrier, film, or the like (e.g., the metal layers 90 and 92), and attached to the support layers 20, 30.

As further shown in FIG. 1, laminated card 1 may include human-readable account indicia 40a indicative of or associable with a payment account to be administered by an issuer of a payment card (e.g. a payment account administered by a financial institution such as a bank or credit union), a membership account, a loyalty account, etc., and additional human-readable account indicia 40b associated therewith. For example, the visible indicia 40a may comprise, human-readable characters indicative of a corresponding account (e.g. an account number), and visible indicia 40b may include additional human-readable characters corresponding with the given account, including a corresponding card expiration date, a corresponding account service grade level, and/or corresponding customer-specific data (e.g. customer name, customer duration data, etc.). In FIG. 1, human-readable account indicia 40a, 40b are provided for viewing from the first side of the laminated card 1. In other embodiments, human-readable account indicia 40a and/or 40b may be also or alternatively provided for viewing from the second side of the laminated card 1.

The human-readable account indicia 40a, 40b may be defined by one or more of:
  laser engraving;
  ink-jet printing;
  thermal-printing on a patch; and,
  embossing.

In one approach, the human-readable account indicia 40a and/or 40b may be defined by embossed characters through the entire thickness of the laminated card, in substantial compliance with ISO/IEC Standard 7811-1. Optionally, and as shown in FIG. 1, an elite brand mark 41 (e.g. indicative of a specific payment network or card association) may be affixed to the first side of the laminated card 1.

As shown in FIG. 1, laminated card 1 may also include a pocket 42 defined in the first side of the laminated card 1, with a plurality of contact pads 44 and underlying integrated circuit (IC) chip 46 (e.g. a smart card chip shown in phantom lines) supported on opposing sides of a substrate and disposed within the pocket 42, wherein with the contact pads 44 are located and exposed for contact with a chip card reader device for signal transmissions therebetween to complete a financial transaction (e.g. at an ATM location, a point-of-sale location, etc.). As may be appreciated, the contact pads 44 may be provided for electrical contact interface with a contact chip reader in compliance with ISO/IEC Standard 7816. In turn, account data corresponding with the human-readable account indicia 40a may be stored on the integrated circuit chip 46 for use in contact signal transmissions with a contact chip card reader. Alternatively or additionally, in some embodiments described herein, the laminated card 1 may include an antenna operatively interconnected with the integrated circuit chip 46 for contactless interface with a contactless chip card reader in compliance with ISO/IEC Standard 14443.

In contemplated embodiments, the first support layer 20 may have a thickness of at least about 12% or at least about 15% or at least about 18% of a total thickness of the laminated card 1, wherein a central inner portion of the pocket 42 extends entirely through the first support layer 20 and at least a portion of the core layer 10, and an annular outer portion of the pocket 42 extends in to the first support layer 20 to a depth less than a thickness thereof to define an annular seat in the pocket 42. In turn, the integrated circuit chip 46 may be disposed within the central inner portion of the pocket 42 and an outer annular portion of the downward-facing side of the supporting substrate may be adhesively interconnected to and supported by the annular seat in the pocket 42.

As shown in FIG. 2, laminated card 1 may also include a magnetic stripe 43 affixed to the second side of laminated card 1 for interface with a magnetic stripe card reader. The magnetic stripe 43 may be provided in compliance with ISO/IEC Standard 7810 and/or 7811 to encode account data corresponding with the human-readable account indicia 40a. As further shown in FIG. 2, a signature block 45 and/or hologram 47 may also be affixed to the second side of the laminated card 1 (e.g. via hot-stamping).

The human-readable account indicia 40a, 40b may be provided on laminated card 1 as a part of card personalization. Further, and as noted, the IC chip 46 and magnetic stripe 42 may be encoded during card personalization with data corresponding with the account indicated by human-readable account indicia 40a.

Figure 3:
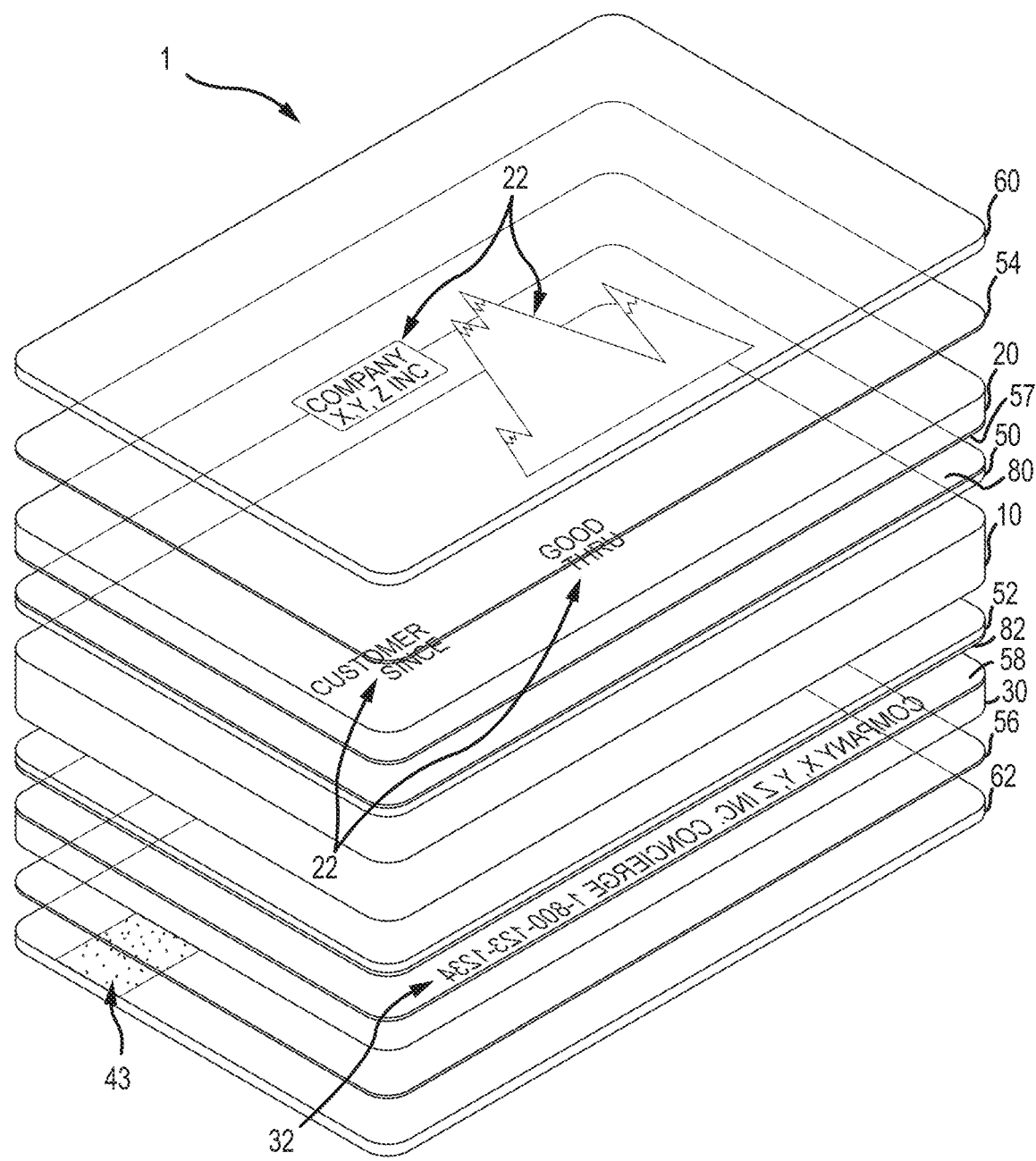
FIG. 3 is an exploded perspective view of various layers that may be provided in an embodiment of a transaction card.

Reference is now made to FIG. 3, which illustrates various additional layers that may be provided in a card body comprising the laminated card 1, wherein the thicknesses of such layers are illustrated exaggerated in relation to the length L and width W dimensions of the laminated card 1. As shown, in addition to the core layer 10, first support layer 20 and second support layer 30, the laminated card 1 may include a first adhesive layer 50 disposed between and interconnecting the core layer 10 and the inward-facing side of the first support layer 20. Similarly, a second adhesive layer 52 may be disposed between and interconnecting the core layer 10 and the inward-facing side of the second support layer 30. The adhesive layers 50, 52 may be thermoplastic adhesives. Additionally, in some embodiments, the adhesive layers 50, 52 may be formed of adhesives formulated to bond to two different materials, allowing a secure bond to be formed between the core 10, which may be a first material different from the material of the first support layer 20 and/or the second support layer 30. For example, in one embodiment, the adhesives are formulated to bond to both PVC and HDPE. In another embodiment, the adhesives are formulated to bond to both PET-G and HDPE. In one embodiment, the adhesive layers 50, 52 are formed of an EVA with a molecular weight around 25 to 160 kg/mol, such as the one manufactured by Transcendia and marketed under the brand name KRTY. In another embodiment, one or both of the adhesive layers 50, 52 (or portions thereof) are formed of an ethylene-ethyl acrylate (EEA), such as the one manufactured by Dow and marketed under the brand name AMPLIFY EA 101. For example, in one embodiment, the adhesives layers may be formed of a compounded adhesive that includes EEA as a component and EVA as another component. However, the type of adhesive used to couple the support layers and the core may be varied depending on the materials used and manufacturing processes and may include, for example polyurethane, acrylic, or various compositions or copolymers including EVA, EEA, EVA and polyurethane combination, polyurethane, urethane, or acrylic.

Figure 9:
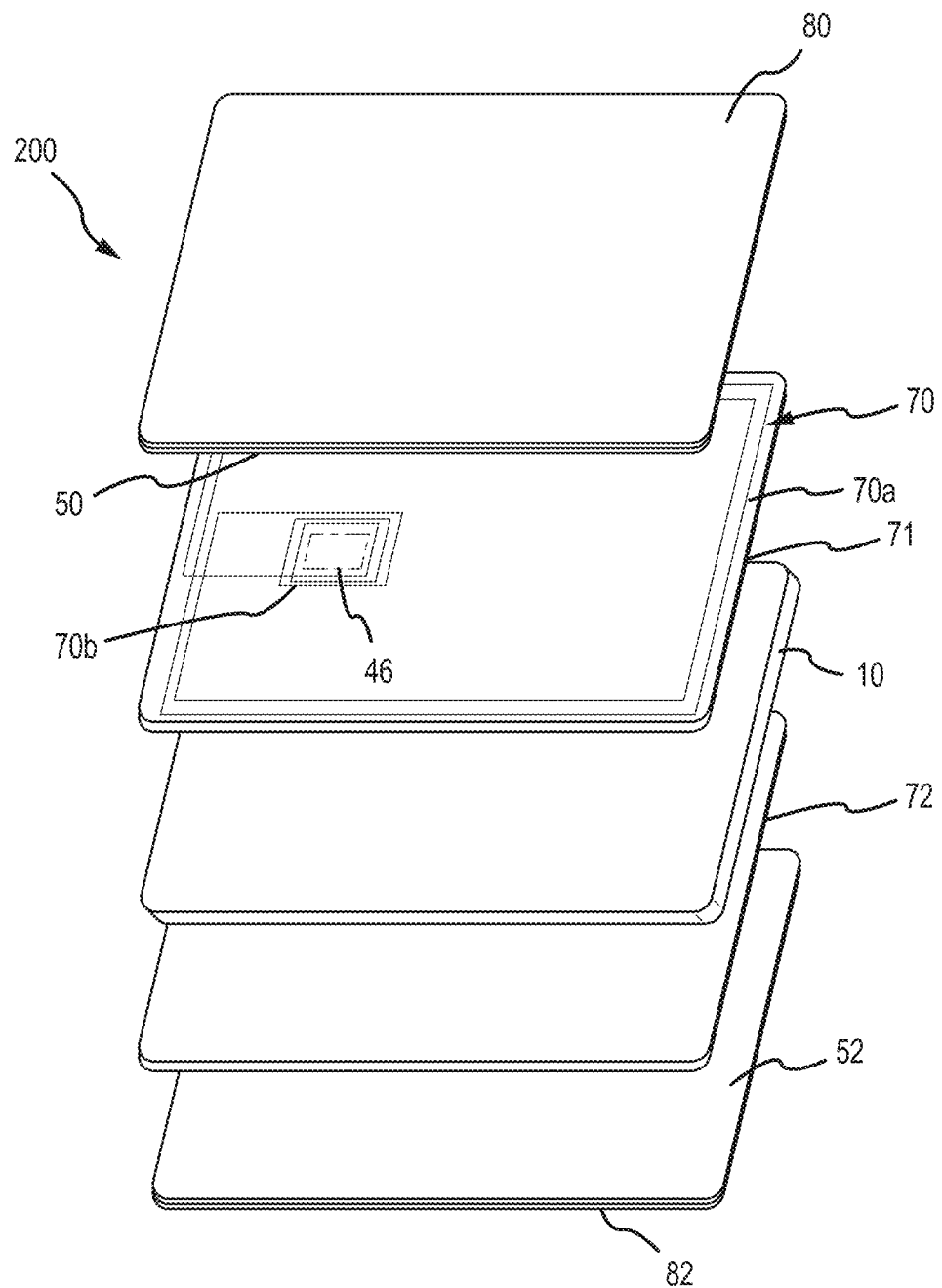
FIG. 9 is an exploded perspective view of another embodiment of an inlay for inclusion in the embodiment of FIG. 7.
Figure 12:
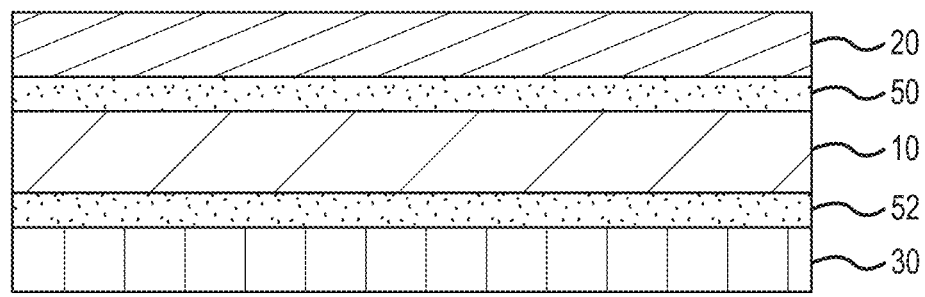
FIG. 12 is a section view, taken along line 12-12 of FIG. 2, of a transaction card.
Figure 14:
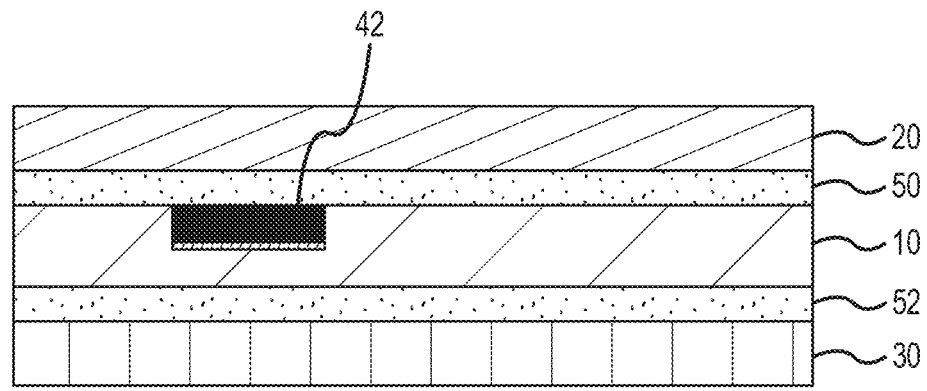
FIG. 14 is a section view, taken along line 14-14 of FIG. 1, of a transaction card including an integrated circuit chip.
Figure 19:
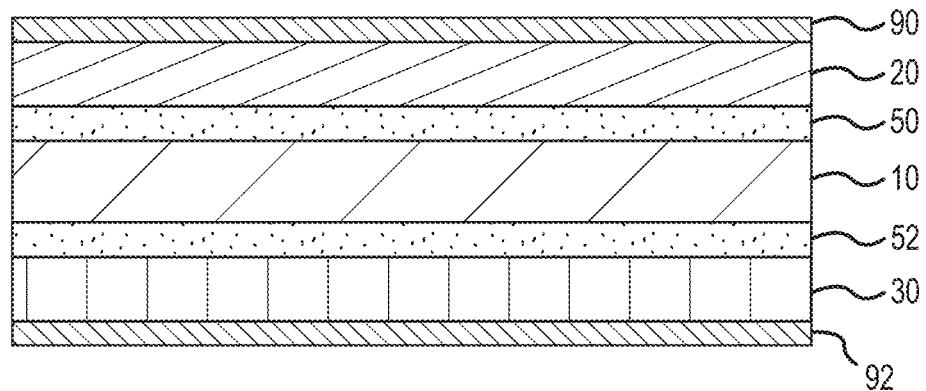
FIG. 19 is a section view, taken along line 19-19 of FIG. 17, of a transaction card.

In one approach, the first adhesive layer 50 may be supportably disposed (e.g. extruded) on the first side of the core layer 10, and/or the second adhesive layer 52 may be supportably disposed (e.g. extruded) on the second side of the core layer 10. In another approach, the first adhesive layer 50 may be supportably disposed (e.g. extruded) on an inward-facing side of the first support layer 20, and/or the second adhesive layer 52 may be supportably disposed (e.g. extruded) on the inward-facing side of the second support layer 30. In some instances, the application of disposition of the adhesive onto the core layer 10 or support layers 20, 30 depends on the type of adhesive. As shown in FIG. 12, which is a cross-section of the laminated card of FIG. 2 taken along line 12-12 in FIG. 2, the layering of thermoplastic adhesive between the support layers 20, 30 and the core 10, result in a sandwich or otherwise layered structure. As shown in FIG. 19, the laminated card 2 may also include layering of thermoplastic adhesive between the support layers 20, 30 and the core 10, resulting in a sandwich or otherwise layered structure, where the metal layers 90, 92 are deposited or bonded to the outer surfaces of the support layers 20, 30. In some implementations, the laminated card 2 may include only one metal layer. For example, a laminated card 2 may include the metal layer 90 deposited on the support layer 20 without a metal layer deposited on the support layer 30. Though not shown in FIG. 12, the laminated card of FIG. 2 may include communication elements or devices, such as one or more antennas or chips (e.g., IC chips) embedded or partially within layers of the laminated card (or otherwise connected to the card). For example, an antenna as shown in FIG. 9 or a chip as shown in FIG. 14 may be adjacent to or embedded in the core 10.

In yet another approach, the first adhesive layer 50 may be supportably disposed (e.g. extruded) on a polymer-based first carrier layer 80 that is thereby connected to the first side of the core layer 10 and/or the second adhesive layer 52 may be supportably disposed (e.g. extruded) on a polymer-based second carrier layer 82 that is thereby connected to the second side of the core layer 10. In turn, a first intermediate thermoplastic or thermosetting adhesive layer 57 may be directly connected (e.g. bonded by printing) to an inward-facing side of the first support layer 20 that is thereby connected to an outward-facing side of the first carrier layer, and a second intermediate thermoplastic or thermosetting adhesive layer 58 may be directly connected (e.g. bonded by printing) to an inward-facing side of the second support layer 30 that is thereby connected to an outward-facing side of the second carrier layer.

Figure 13:
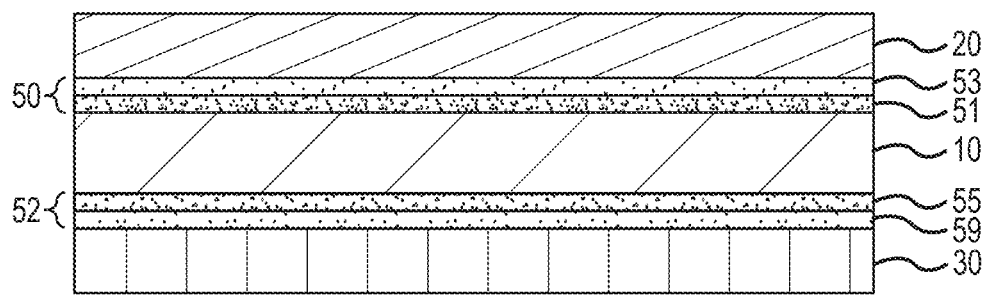
FIG. 13 is a section view, taken along line 12-12 of FIG. 2, of another embodiment of a transaction card.

With reference to FIG. 13, in yet another approach, the first adhesive layer 50 may include two differently formulated adhesives combined or layered. For example, a first adhesive 53 may be supportably disposed (e.g., extruded, rolled, or otherwise applied) on an inward-facing side or surface of the first support layer 20 and a second adhesive 51 may be supportably disposed (e.g., extruded) on the first side or first surface of the core layer 10. The first adhesive 53 and the second adhesive 51 may also be supportably disposed on opposing sides of a carrier layer (e.g., a 1 mil PET carrier layer) that is positioned between the first support layer 20 and the core layer 10. The first adhesive layer 50 is formed including an interface of the first adhesive and the second adhesive. Similarly, the second adhesive layer 52 may comprise two distinct adhesives or adhesive components or portions. A third adhesive 59 may be supportably disposed (e.g., extruded) on an inward-facing side of the second support layer 30 and a fourth adhesive 55 may be supportably disposed (e.g., extruded) on the second side of the core layer 10. The third adhesive 59 and the fourth adhesive 55 may also be supportably disposed opposing sides of a carrier layer (e.g., a 1 mil PET carrier layer) that is positioned between the second carrier layer 30 and the core layer 10. The second adhesive layer 52 is then formed including an interface of the third adhesive and the fourth adhesive. In this manner, each adhesive layer may be formed of two different adhesive materials, where the first adhesive material is formulated to bond well to the support layer material (e.g., vinyl or PVC) and the second adhesive material is formulated or configured to bond well to the core layer 10 (e.g., HDPE), and both adhesive materials are configured to bond to each other, so as to generate a bonded adhesive layer between the support layer and the core surface. Adhesives described above including, EVA, EEA, thermoplastic adhesives, and other adhesives may form a component of the first or second adhesive layers 50, 52 or may be form the first or second adhesive layers 50, 52. Additionally, the first adhesive layer 50 and the second adhesive layer 52 may be formed from different adhesives.

As further shown in FIG. 3, laminated card 1 may also include a first overlaminate layer 60, such as a polymer based material (e.g., PVC or PET-G), interconnected to an outward-facing side of the first support layer 20 and extending from across the length L and the width W of the laminated card 1, and/or a second overlaminate layer 62, which may be a polymer based material (e.g., PVC or PET-G), interconnected to an outward facing side of the second support layer 30 and extending from across the length L and the width W of the laminated card 1. The first overlaminate layer 60 and/or the second overlaminate layer 62 may be transparent to facilitate the viewing of the first print layer 22 and/or the second print layer 32 that may be provided on the first support layer 20 and/or second support layer 30, respectively, as discussed above. The second overlaminate layer 62 may be provided with magnetic stripe 43 on an outward-facing side thereof.

Figure 18:
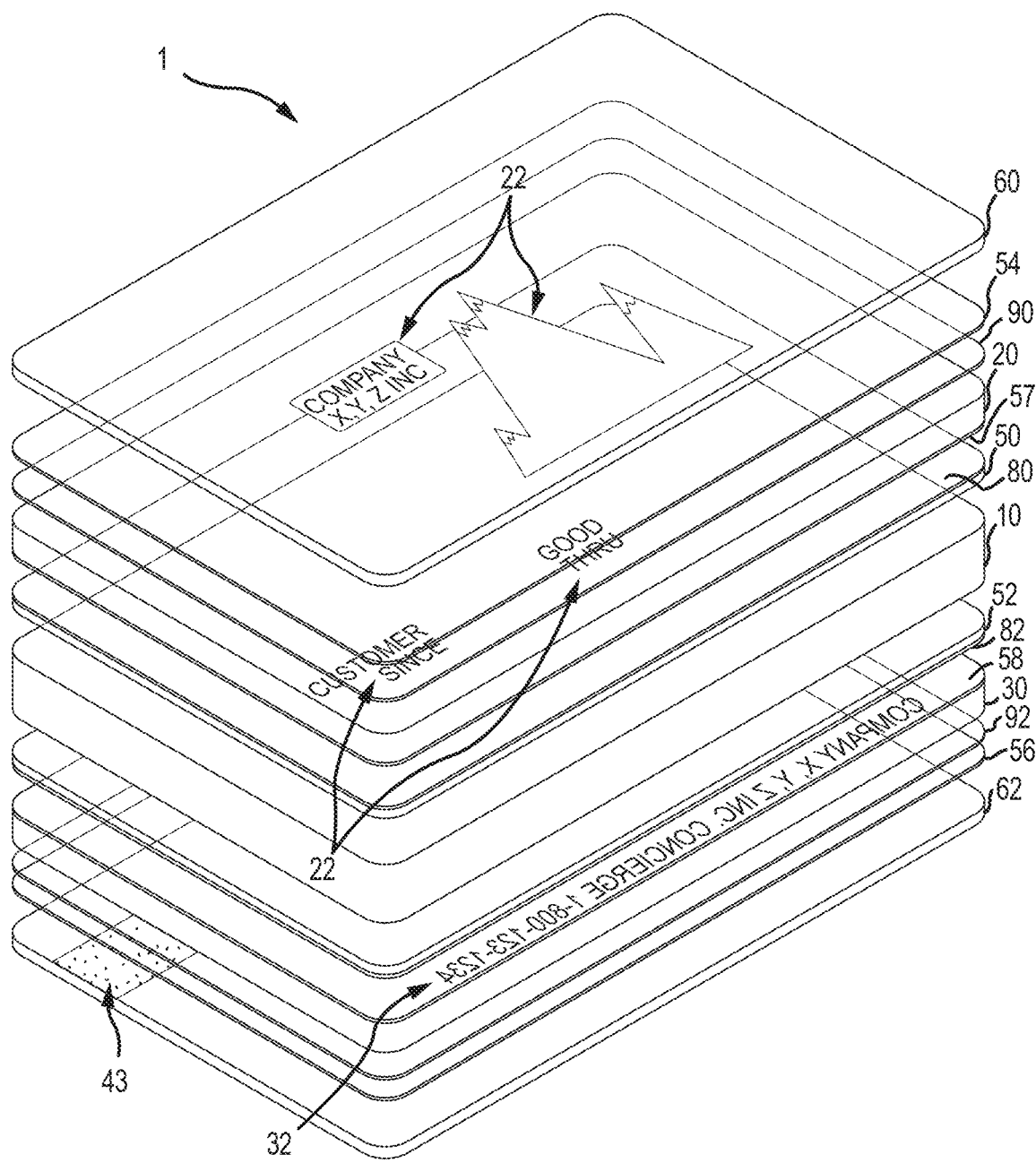
FIG. 18 is an exploded perspective view of various layers that may be provided in an embodiment of a transaction card.

Additionally, as shown in FIG. 18, a laminated card 2 may include a first metal film layer 90 bonded to or deposited on an outward facing surface of the first support layer 20 and a second metal film layer 92 bonded to or deposited on an outward facing surface of the second support layer 30. Accordingly, a metal layer may be visible on both sides of the final transaction card 2. The first metal film layer 90 and the second metal film layer 92 may be made from any type of metal, alloy, or the like. Where the first metal film layer 90 and the second metal film layer 92 are metal vapor film layers, the metal film layers 90, 92 may be any metal or alloy with a vaporization temperature low enough to be withstood by the first support layer 20 and the second support layer 30 (e.g., the metal vaporizes at a temperature below the melting temperature of the first support layer 20 and the second support layer 30). The first metal film layer 90 and the second metal film layer 92 may also be made from a metal foil bonded to the support layers 20 and 30 by an adhesive layer.

The first metal film layer 90 and the second metal film layer 92 may have a much smaller thickness than the first support layer 20 and the second support layer 30. For example, the thickness of the first metal film layer 90 and the second metal film layer 92 may be measured in Angstroms. The laminated card 2 including the first metal film layer 90 and the second metal film layer 92 may include any of the features, components, or materials described with respect to the laminated card 1 and may be manufactured using the processes described with respect to the laminated card 1.

Additionally, and as further shown in FIG. 3, laminated card 1 may include a polymer-based, optionally transparent, first outer thermosetting or thermoplastic adhesive layer 54 disposed between and interconnecting the first support layer 20 and an inward-facing side of the first overlaminate layer 60. Similarly, a polymer-based, optionally transparent, second outer thermosetting or thermoplastic adhesive layer 56 may be disposed between and interconnecting the second support layer 30 and the inward-facing side of the second overlaminate layer 62. In one approach, the first outer thermosetting or thermoplastic adhesive layer 54 may be supportably disposed on an inward-facing side of the first overlaminate layer 60 (e.g. printed thereupon), and the second outer thermosetting or thermoplastic adhesive layer 56 may be supportably disposed on an inward-facing side of the second overlaminate layer 62 (e.g. printed thereupon). In another approach, the first outer thermosetting or thermoplastic adhesive layer 54 may be supportably disposed on an outward-facing side of the first support layer 20, and the second thermosetting adhesive layer 56 may be supportably disposed on an outward-facing side of the second support layer 30.

As indicated above, in some embodiments the first adhesive layer 50 may be supportably disposed on an inward-facing side or interior surface of a polymer-based first carrier layer 80 that is located on an inward-facing side of the first support layer 20 and extends across the length L and width W of the laminated card 1 (e.g. printed thereupon) and/or the second adhesive layer 52 may be supportably disposed (e.g. extruded) on an inward-facing side of a polymer-based second carrier layer 82 that is located on an inward-facing side of the second support layer 30 and extends across the length L and width W of the laminated card 1 (e.g. printed thereupon). In such embodiments, laminated card 1 may include a polymer-based, first intermediate thermosetting or thermoplastic adhesive layer 57 disposed between and interconnecting the first support layer 20 and the first carrier layer 80. Similarly, a polymer-based, second intermediate thermosetting or thermoplastic adhesive layer 58 may be disposed between and interconnecting the second support layer 30 and the second carrier layer 82. In one approach, the first intermediate thermosetting or thermoplastic adhesive layer 57 may be supportably disposed on an inward-facing side of the first support layer 20 (e.g. printed thereupon), and the second intermediate thermosetting or thermoplastic adhesive layer 58 may be supportably disposed on an inward-facing side of the second support layer 30 (e.g. printed thereupon).

In contemplated embodiments, the first support layer 20 and the second support layer 30 may comprise the same one or different ones of:
- polyvinyl chloride;
- polyethylene terephthalate glycol (PET-G);
- polyethylene terephthalate; and,
- polycarbonate.

The first support layer 20 and the second support layer 30 may comprise any of the above materials in either recycled or virgin form. In various embodiments, the first adhesive layer 50 and/or the second adhesive layer 52 may be thermoplastic adhesive layers and may comprise the same one or different ones of:
- ethylene vinyl acetate;
- acrylic; and,
- urethane.

In one approach, the first and second thermoplastic adhesive layers 50, 52 may each comprise ethylene vinyl acetate having an activation temperature of about 100° C. to about 120° C. (e.g. about 104° C.). In some implementations, the first and second outer thermosetting or thermoplastic layers 54, 56, and/or the first and second intermediate thermosetting or thermoplastic layers may comprise the same on or different ones of:
- polyester;
- urethane; and,
- acrylic.

In that regard, the plurality of layers of laminated card 1, as described in relation to FIG. 1, FIG. 2 and/or FIG. 3, may be arranged in stacked relation to establish interconnections therebetween to provide the laminated card 1. For example, after stacked arrangement of the plurality of layers, and prior to the provision of the human-readable account indicia 40a, 40b, pocket 42, contact pads 44, IC chip 46, elite brand mark 41, signature block 45 and hologram 47, the plurality of layers may be laminated by heating under pressure to a predetermined temperature range across the plurality of layers, wherein the first and second thermoplastic adhesive layers 50, 52, the first and second outer thermosetting or thermoplastic adhesive layers 54 and 56, and if provided the first and second intermediate thermoplastic or thermosetting adhesive layers, are activated, or cured, so as to fixedly interconnect the corresponding adjacent layers between which such adhesive layers are disposed.

In contemplated embodiments, the lamination or bonding process may include heating the plurality of card layers to obtain a temperature across the plurality of card layers that is equal to or greater than an activation temperature of the first thermoplastic adhesive layer 50 and an activation temperature of the second thermoplastic adhesive layer 52, and less than a melting point temperature of the first support layer 20, a melting point temperature of the second support layer 30, and a melting point temperature of core layer 10, e.g., past the glass transition temperature and towards the viscous temperature, depending on the material.

In some implementations, the first thermoplastic adhesive layer 50 and the second thermoplastic adhesive layer 52 may have an activation temperature of no more than about 130° C., or no more than about 120° C. (e.g. about 90° C. to 120° C.), the first and second outer thermosetting or thermoplastic adhesive layers 54, 56, and if utilized the first and second intermediate thermoplastic or thermosetting adhesive layers, may each have an activation temperature of no more than about 130° C., and in contemplated embodiments no more than about 120° C. (e.g. about 90° C. to 120° C.), and the first support layer 20, the second support layer 30, the core layer 10, and if utilized the first and second carrier layers, may each have a corresponding melting point or glass transition temperature greater than about 130° C., and in contemplated embodiments greater than about 135° C. In turn, the heating may be provided to activate the first and second thermoplastic adhesive layers 50, 52, the first and second outer thermosetting or thermoplastic adhesive layers 54, 56, and if utilized the first and second intermediate thermosetting or thermoplastic adhesive layers, for bonded interconnection of the core layer 10 to the first and second support layers 20, 30, and if utilized the first and second carrier layers located therebetween, and bonded interconnection of the first and second overlaminate layers 60, 62 to the first and second support layers 20, 30, substantially free from varying the relative positions of the core layer 10 and first and second support layers 20, 30. In conjunction with such implementations, the first support layer 20 and the second support layer 30 may each have a Vicat softening temperature of at least about 80° C., the core layer 10 may have a Vicat softening temperature of at least about 110° C., and in some cases at least about 120° C., and if utilized the first and second carrier layers may each have a Vicat softening temperature of at least about 110° C.

In some embodiments, the application of heat and pressure may include heating the plurality of card layers to obtain a temperature of at least about 85° C., and no more than about 120° C. or 135° C. across the plurality of card layers (e.g. about 90° C. to about 130° C.), wherein a pressure of about 0.55 N/mm$^2$ to about 0.83 N/mm$^2$, and no greater than about 0.90 N/mm$^2$, is applied across the plurality of card layers during the heating (e.g. for a duration of about 10 minutes to about 30 minutes). Further, after the application of heat and pressure, the plurality of layers may be cooled in the lamination process (e.g. to obtain a temperature of about 32° C. to about room temperature across the plurality of layers), wherein an increasing pressure is applied across the plurality of layers during cooling. For example, during cooling the applied pressure may be increased in steps, starting from about 0.55 N/mm$^2$ to about 0.83 N/mm$^2$, increasing to at least about 1.0 N/mm$^2$. As can be understood, the temperatures and pressures described herein are meant as illustrative only and may be varied based on, time for heating/cooling, number of cards being heated/cooled simultaneously, type of machine, materials and thickness, and the like. To that end, the exact manufacturing processes and set points may vary, but should generally be configured to activate a bond between the adhesives, the support layers, and the core, without causing the materials to full "run out" or melt, but rather soften.

For example, in other embodiments, such as where a more secure bond may be desired or where manufacturing machines may dictate other values, the lamination or bonding processes may include heating the plurality of card layers to a temperature of about 130 to 150, such as to obtain a temperature of about 140° C. across the plurality of card layers, wherein a pressure of about 0.55 N/mm to about 0.83 N/mm$^2$, and in some instances no greater than about 0.90 N/mm$^2$, is applied across the plurality of card layers during the heating (e.g. for a duration of about 10 minutes to about 30 minutes). In this example, the temperature of about 140° C. is above the activation temperature of the first and second adhesive layers 50, 52 and above the glass transition temperature of the first and second support layers 20, 30 and the core layer 10, allowing for secured bonding between the various layers of the plurality of layers, since the support layer and the core layer will begin to soften sufficiently to assist in the bonding. Further, after the application of heat and pressure, the plurality of layers may be cooled in the lamination process (e.g. to obtain a temperature of between 30 to 40° C., such as 32° C., to about room temperature across the plurality of layers), where an increasing pressure is applied across the plurality of layers during cooling. For example, during cooling the applied pressure may be increased in steps, starting from about 0.55 N/mm$^2$ to about 0.83 N/mm$^2$, increasing to at least about 1.0 N/mm$^2$.

In some embodiments, the application of heat and pressure may occur in two stages. A first application of heat and pressure activates the first and second adhesive layers 50, 52 to bond the first and second support layers 20, 30 to the core layer 10. The bonded material is then allowed to cool completely (e.g., over a few hours or days) before print layers are applied to the first and second support layers 20, 30. A second application of heat and pressure bonds the print layers to the first and second support layers 20, 30 and activates the first and second outer thermosetting adhesive layers 54, 52 to bond the first overlaminate layer 60 to the first support layer 20 and the second overlaminate layer 62 to the second support layer 30. The second process may be considered an end lamination process that acts to "finalize" the product with the graphical or printed layers.

In some implementations, prior to arranging the plurality of layers in stacked relation, the method may further include treating the first side of the core layer 10 and the second side of the core layer 10 to increase a surface energy, or surface adhesion, thereof, thereby facilitating bonding with the first and second thermoplastic adhesive layers. That is, in some instances, the core layer 10 may be formed of a material that does not bond well to either adhesives or other materials, such as PVC, and by increasing the surface energy of the core, the core may be better able to bond with the support layers. By way of example, the treating may include one or more of:

a corona treatment:
electron beam treatment;
flame treatment; and,
primer treatment.

In particular, the method may include treating the first side and/or the second side of the core layer 10 (e.g. via corona, electron beam, flame and/or primer treatment) to provide a surface energy of at least about 34 dyne, and preferably at least about 40 dyne or even 58 dyne, and thereby facilitating bonding with the first and second thermoplastic adhesive layers 52,54. In one approach, the first side and/or second side of the core layer 10 may have a surface energy of about 58 dyne.

In one example, a laminated card 1 may be provided with layers having the following nominal thicknesses:

first overlaminate layer 60 with first outer thermosetting or thermoplastic adhesive layer 54 applied thereto: about 2 mils (0.051 mm);
first support layer 20 with or without first intermediate thermoplastic or thermosetting adhesive layer 57 applied thereto: about 5 mils-8 mils (0.127 mm-0.203 mm), typically about 6 mils;
first thermoplastic adhesive layer 50 with or without interconnected first carrier layer 80: about 1 mil-3 mils (0.025 mm-0.076 mm);
core layer 10: about 10 mils-12 mils (0.279 mm-0.305 mm);
second thermoplastic adhesive layer 52 with or without interconnected second carrier layer 82: about 1 mil-3 mils (0.025 mm-0.076 mm);
second support layer 30 with or without second intermediate thermoplastic or thermosetting adhesive layer 58 applied thereto: about 5 mils-8 mils (0.127 mm-0.203 mm), typically about 6 mils (0.152 mm);
second overlaminate layer 62 with second outer thermosetting or thermoplastic adhesive layer 56 applied thereto: about 2 mils (0.051 mm).

In conjunction with such example, the laminated card 1 may have a post-lamination thickness of about 27 mils-33 mils (0.686 mm-0.838 mm).

In some embodiments, subsequent to interconnection of the plurality of layers of the laminated card 1, the visible indicia 40, pocket 42, contact pads 44, IC chip 46, elite brand mark 41, signature block 45 and hologram 47, may be provided as shown in FIGS. 1 and 2.

For example, as shown in FIG. 14, the pocket 42 may be provided to extend through a portion of the thickness of the laminated card 1 from the first side thereof, wherein at least a portion of the pocket 42 extends entirely through the first overlaminate layer 60, first outer thermosetting or thermoplastic adhesive layer 54, first support layer 20, first intermediate thermoplastic or thermosetting adhesive layer and first carrier layer if provided, first thermoplastic adhesive layer 52, and through all or at least a portion of the core layer 10. In one approach, a first portion P1 of the pocket 42 may be defined by a first operation (e.g. milling and/or die pressing) so that the first portion extends through the noted layers, and a second portion P2 of the pocket 42 may be defined by a second operation (e.g. milling) so that the second portion enlarges a cross-dimension of the open end of pocket 42, through at least a portion of the first support layer 20, but does not extend in to the core layer 10 of the laminated card 1. For example, the second portion may be of a ring-shaped configuration that adjoins and extends about the first portion at the first side of the laminated card 1, thereby defining a shelf within pocket 42.

Following the formation of the pocket 42, contact pad 44 and IC chip 46 may be located in the pocket 42. As indicated, in one approach, the contact pads 42 may be supportably interconnected to a top side of a substrate carrier, and the IC chip 46 may be supportably interconnected to an opposing bottom side of the substrate carrier with one or more electrical connections provided between the IC chip 46 and contact pads 44 to define an IC chip module that is secured within the pocket 42 (e.g. via an adhesive provided on at least the above-referenced shelf within the pocket 42), with at least a portion of the IC chip 46 projecting in to the first portion of pocket 42 that extends through the core layer 10. In the later regard, the IC chip may be disposed free from electrical interconnection with the core layer 10.

Additionally, subsequent to assembly and interconnection of the layers of the laminated card 1, optional elite brand mark 41, signature panel 45 and hologram 47 may be affixed (e.g. hot-stamped). Further, the human-readable account indicia 40a, 40b may be defined, and the IC chip 46 and magnetic stripe 43 may be encoded with personalization data, during card personalization procedures.

Figure 5:
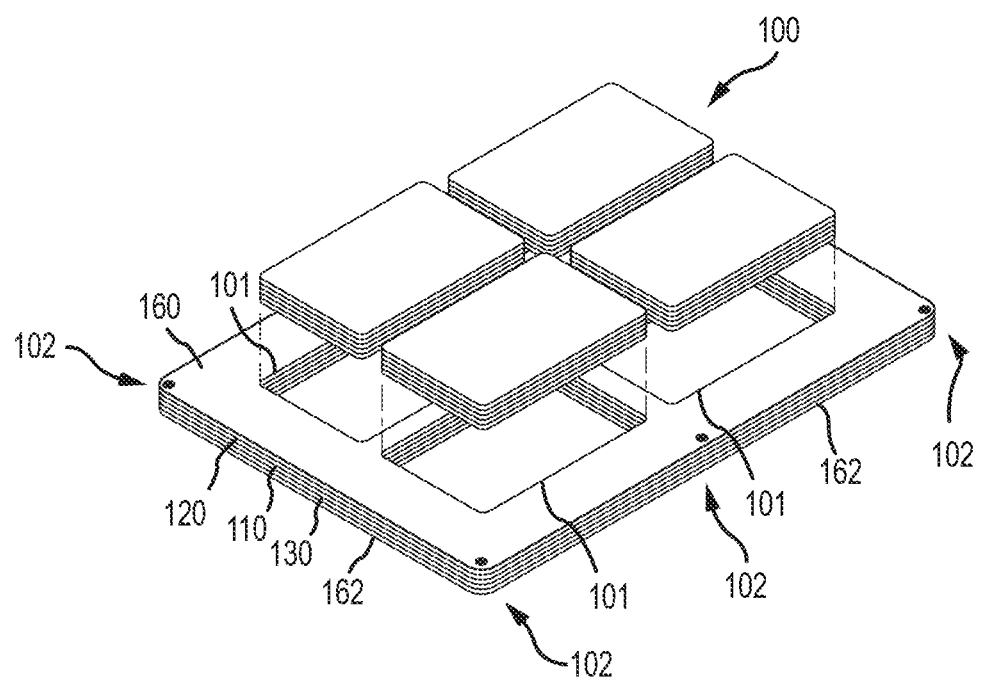
FIG. 5 is a perspective view of the multi-layer assembly embodiment of FIGS. 4 and 5 with a plurality of card bodies being separated therefrom during production.
Figure 6:
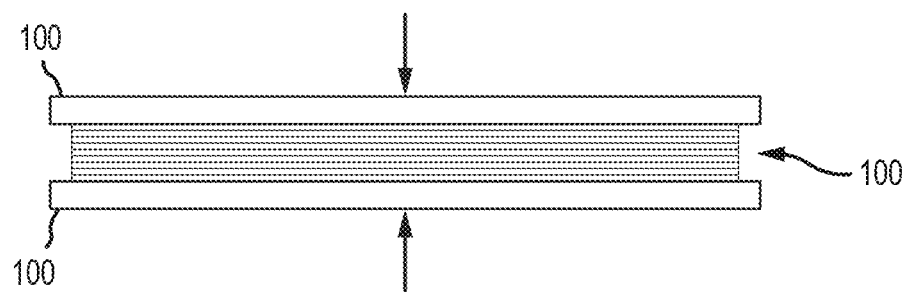
FIG. 6 is a side schematic view of the multi-layer assembly of FIGS. 4 and 5 during lamination of the various layers thereof.

In some embodiments, laminated card 1 may be produced as one of a corresponding plurality of laminated cards to realize production efficiencies. In that regard, reference is now made to FIGS. 4-6 which illustrate the collating of a multi-sheet assembly 100 of multiple sheet layers having a plurality of sheet regions 101 from which a plurality of card bodies may be separated and further processed to yield a corresponding plurality of laminated cards, each as described above in relation to laminated card 1. While FIGS. 4-6 illustrate the assembly of a multi-sheet assembly 100 having four sheet regions 101 from which four card bodies may be separated (i.e. arranged in two rows and two columns), a larger multi-sheet assembly may be utilized to yield a greater number of card bodies (e.g. 56 card bodies arranged in 8 rows and 7 columns).

Figure 4:
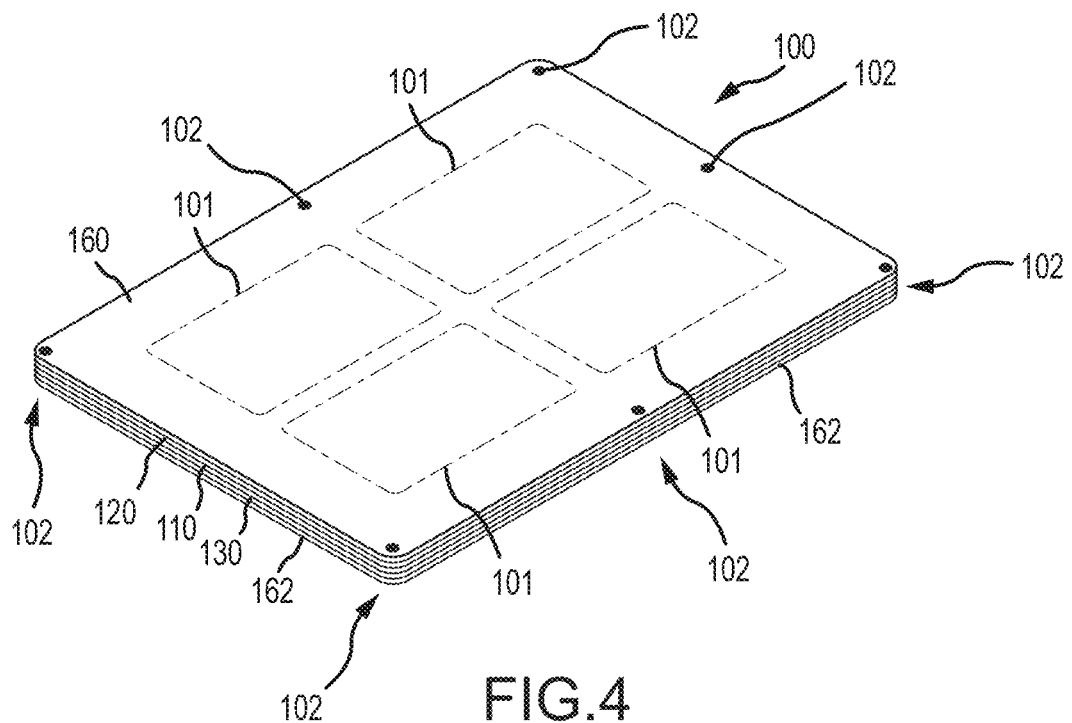
FIG. 4 is a perspective view of one embodiment of a collated multi-layer assembly for production of a plurality of transaction cards.

With specific reference to FIG. 4, a core sheet 110 (corresponding with core layer 10), a first support sheet 120 (e.g. corresponding with first support layer 20) and second support sheet 130 (e.g. corresponding with second support layer 30) may be collated in to the multi-sheet assembly 100 so that inward-facing sides of first support sheet 120 and second support sheet 130 are located in opposing relation to first and second sides of the core sheet 110. The various sheets shown in FIG. 4 corresponding to a particular layer may generally be formed of the same material and have the same thickness and other material properties as the corresponding component layer. For example, the core sheet 110 comprises a material that, when formed and cut into transaction cards, forms or defines the core 10. Similarly, the first support sheet 120 and the second support sheet comprise a material that, when formed and cut into transaction cards, forms or defines the first support layer 20 and the second support layer 30, respectively, While not shown, in contemplated embodiments a first thermoplastic adhesive sheet-like layer (e.g. corresponding with first thermoplastic layer 50) may be provided between the inward-facing side of the first support sheet 120 and a first side of the core sheet 110 facing the first support sheet 120, and a second thermoplastic adhesive sheet-like layer (e.g. corresponding with second thermoplastic layer 52) may be provided between the inward-facing side of the second support sheet 130 and a second side of core sheet 110 facing the second support sheet 130, as part of the multi-sheet assembly 100. In one approach, a first thermoplastic adhesive sheet-like layer may be extruded on and thereby supported by the first side of the core sheet 110 and/or the second thermoplastic adhesive sheet-like layer may be extruded on and thereby supported by the second side of the core sheet 110 prior to collating the multi-sheet assembly 100. In another approach, the first thermoplastic adhesive sheet-like layer may be extruded on and thereby supported by the inward-facing side of the first support sheet 120 and/or the second thermoplastic adhesive sheet-like layer may be extruded on and thereby supported by the inward-facing side of the second support sheet 130, as part of the multi-sheet assembly 100.

In yet another approach, the first thermoplastic adhesive sheet-like layer may be supportably provided on an inward-facing side of a polymer-based, first carrier sheet (e.g. a sheet comprising polyethylene terephthalate and corresponding with the first carrier layer described above) and/or the second thermoplastic adhesive sheet-like layer may be supportably provided on an inward-facing side of a polymer-based, second carrier sheet (e.g. a sheet comprising polyethylene terephthalate and corresponding with second carrier layer described above). In turn, in collating the multi-sheet assembly 100, the first carrier sheet may be provided between the core sheet 110 and the inward-facing side of the first support sheet 120, and the second carrier sheet may be provided between the core sheet 110 and the inward-facing side of the second support sheet 120, as part of the multi-sheet assembly 100. In conjunction with such approach, an intermediate first thermoplastic or thermosetting adhesive sheet-like layer may be supportably provided on an inward-facing side of the first support sheet, and an intermediate second thermoplastic or thermosetting adhesive sheet-like layer may be supportably provided on an inward-facing side of the second support sheet, as part of the multi-sheet assembly 100.

Additionally, in contemplated embodiments a transparent, first overlaminate sheet 160 (e.g. corresponding with first overlaminate layer 60) and a transparent, second overlaminate sheet 162 (e.g. corresponding with second overlaminate layer 62) may be arranged so that inward-facing sides thereof are located in opposing relation to outward-facing sides of the first support sheet 120 and second support sheet 130, respectively. In turn, while not shown, in contemplated embodiments a transparent, first outer thermosetting or thermoplastic adhesive sheet-like layer (corresponding with first outer thermosetting or thermoplastic adhesive layer 54) may be provided between the outward-facing side of the first support sheet 120 and the inward-facing side of the transparent, first overlaminate sheet 160, and a transparent, second outer thermosetting or thermoplastic adhesive sheet-like layer (corresponding with second outer thermosetting or thermoplastic adhesive layer 56) may be provided between the outward-facing side of the second support sheet 130 and the inward-facing side of the second overlaminate sheet 162 as part of the multi-sheet assembly 100. In one approach, the first and second outer sheet-like outer thermosetting or thermoplastic adhesive layers may be coatings applied to the inward-facing sides of the first and second overlaminate sheets, respectively.

Prior to collating the multi-sheet assembly 100 as shown in FIG. 4, printing may be provided at each of a plurality of different locations (i.e. in corresponding relation to each of the plurality of sheet regions 101 from which a corresponding plurality of card bodies will be separated) on the first support sheet 120 to provide a corresponding plurality of first print layers 22 as described above in relation to FIGS. 1 and 3. In that regard such printing may be the same for each of the card bodies 101 to be separated. Similarly, printing may be provided at each of a plurality of different locations (i.e. in corresponding relation to each of the plurality of sheet regions 101 from which a corresponding plurality of card bodies will be separated) on the inward-facing side and/or outward-facing side of the second support sheet 130 to provide a corresponding plurality of second print layers as described above in relation to FIGS. 2 and 3. In that regard, such printing may be the same for each of the card bodies to be separated.

To interconnect the first overlaminate sheet 162, first support sheet 120, first carrier sheet if provided, core sheet 110, second carrier sheet if provided, second support sheet 130 and second overlaminate sheet 162 together, the multi-sheet assembly 100 may be laminated together via activation of the above-referenced thermoplastic adhesive and thermosetting adhesive, sheet-like layers. In that regard, and with reference to FIG. 6, heat and pressure may be applied to the multi-sheet assembly 100 via opposing platens 200 of a lamination device on opposing sides of the multi-sheet assembly 100. The lamination process may include heating the plurality multi-sheet assembly 100 to obtain a temperature of about 90° C. to about 130° C., and in some cases no more than about 135° C., across the multi-sheet assembly 100, wherein a pressure of about 0.55 N/mm$^2$ to about 0.83 N/mm$^2$ is applied across the multi-sheet assembly 100 during the heating step (e.g. for a total duration of about 10 minutes to about 30 minutes). Further, after the heating and before the defining, the method may include cooling the multi-sheet assembly 100 (e.g. to obtain a temperature of no more than about 32° C. to about room temperature across the multi-sheet assembly 100), wherein an increasing stepped-up pressure is applied across the multi-sheet assembly 100 during the cooling (e.g. for a total duration of about 10 minutes to about 30 minutes). For example, during the cooling step the applied pressure may be increased, starting from at least about 0.55 N/mm² to about 0.83 N/mm², and increasing to at least about 1.0 N/mm².

In other embodiments, the lamination process may include heating the plurality multi-sheet assembly 100 to obtain a temperature of about 140° C., across the multi-sheet or stacked assembly 100, wherein a pressure of about 0.55 N/mm² to about 0.83 N/mm² is applied across the multi-sheet assembly 100 during the heating step (e.g. for a total duration of about 10 minutes to about 30 minutes). Further, after the heating and before the defining, the method may include cooling the multi-sheet assembly 100 (e.g. to obtain a temperature of no more than about 32° C. to about room temperature across the multi-sheet assembly 100), where an increasing or stepped-up pressure is applied across the multi-sheet assembly 100 during the cooling (e.g. for a total duration of about 10 minutes to about 30 minutes). For example, during the cooling step the applied pressure may be increased gradually starting from at least about 0.55 N/mm² to about 0.83 N/mm², and increasing to at least about 1.0 N/mm².

Following interconnection of various sheets and thermoset layers of the multi-sheet assembly 100, a plurality of card bodies may be separated from the multi-sheet assembly 100, as shown in FIG. 5. For example, the cards may be punched, cut, or otherwise separated or defined within the larger sheets. Further, prior to or in conjunction with such separation, pockets or communication device recesses, may be defined in predetermined relation to each of the card bodies to be separated from the multi-sheet assembly 100. In one approach, the pockets may be milled (e.g. utilizing a computer numeric controlled milling machine), followed by separation of the card bodies from the multi-sheet assembly 100 via milling (e.g. utilizing a computer numeric controlled milling machine). In conjunction with such approach, the card bodies may be separated from the multi-sheet assembly 100 first and the pockets milled while the card bodies are still being held in place by a vacuum fixture. In another approach, pockets (e.g. pocket portions P1 and P2 referenced above) may be milled separately in line on a smartcard standalone milling machine or on an inline milling station on a smart card machine.

In other embodiments, the card bodies may be separated from the multi-sheet assembly 100 via a punch and optional polish operation. In turn, the pockets may be milled before or after punching (e.g. while the card bodies are still being held in place by a vacuum fixture). In another approach, pockets (e.g. pocket portions P1 and P2 referenced above) may be milled separately after punching in line on a smartcard standalone milling machine or on an inline milling station on a smart card machine.

Following the separation of card bodies, the card bodies may be cleaned as necessary, and peripheral edges of the card bodies may be polished if desired. In turn, the card bodies may be further processed to yield a plurality of laminated cards, each having features as described above in relation to laminated card 1.

Figure 7:
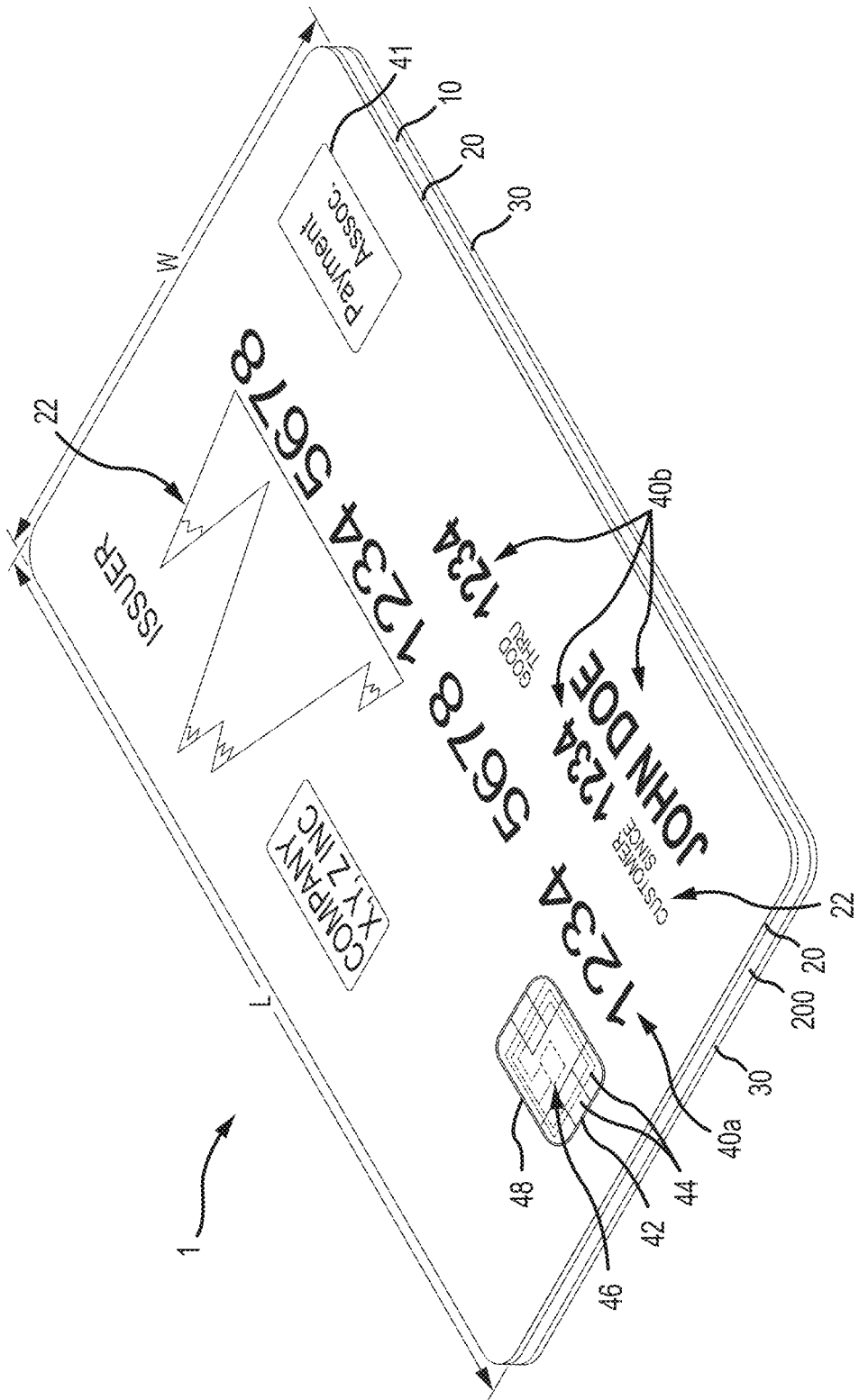
FIG. 7 is a front perspective view of another embodiment of a transaction card.

Reference is now made to FIG. 7 which illustrates a modified embodiment of the laminated card 1 shown in FIGS. 1 and 2, wherein the same reference numerals are utilized for features included in each embodiment and the descriptions provided above apply thereto. As illustrated in FIG. 7, laminated card 1 includes an inlay 200, which may be considered a prelam element or a card core, laminated between first support layer 20 and second support layer 30, wherein the inlay 200 incorporates the core layer 10 of the laminated card 1 shown in FIGS. 1 and 2 (not separately shown in FIG. 7) and extends across the length L and the width W of the laminated card 1.

Figure 8A:
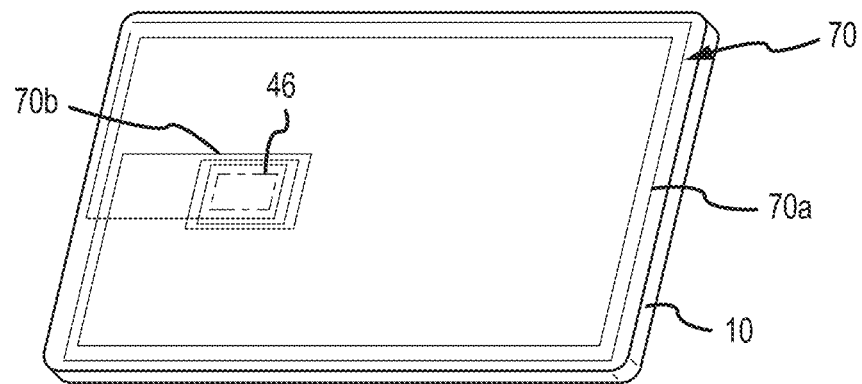
FIG. 8A is a perspective view of an embodiment of a core layer having an antenna located thereon.
Figure 8B:
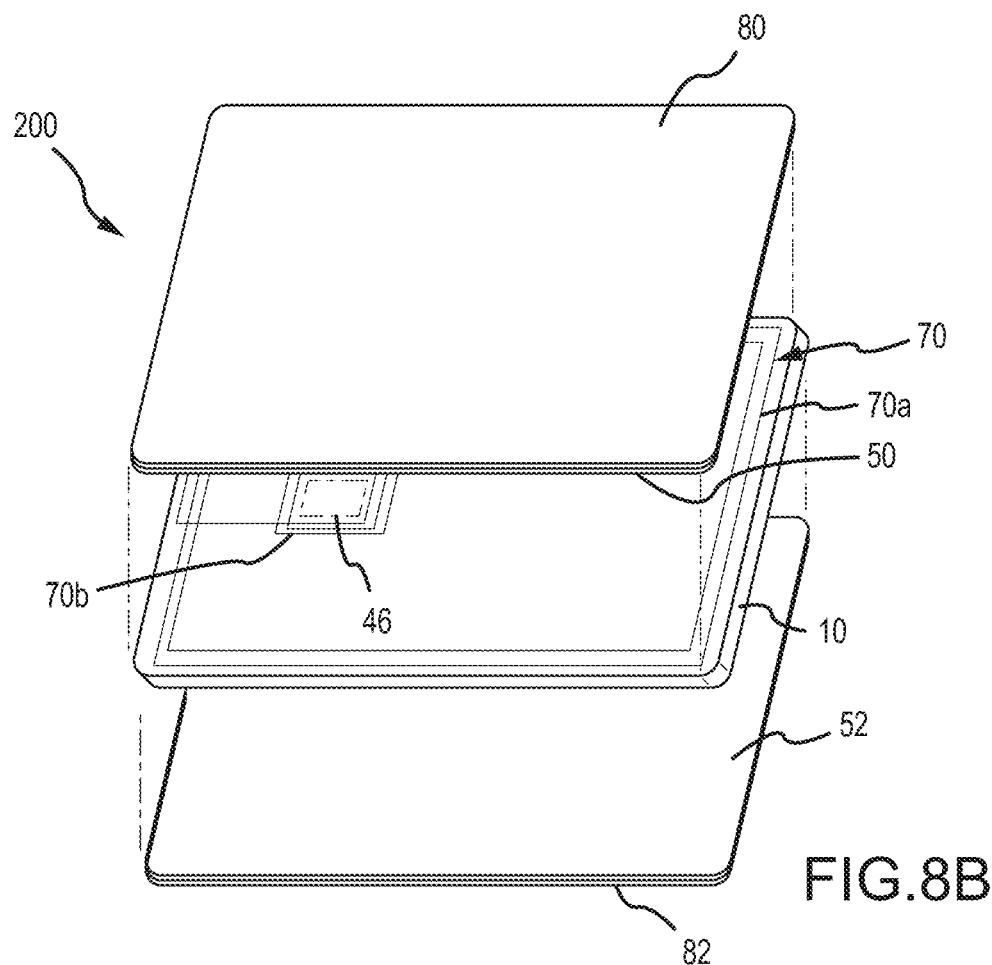
FIG. 8B is an exploded perspective view of an embodiment of an inlay, comprising the embodiment of FIG. 8A, for inclusion in the embodiment of FIG. 7.

In that regard, reference is made to FIG. 8B, which illustrates inlay 200 having a plurality of inlay layers that are arranged and interconnected in a pre-laminating process so that the core layer 10 is disposed between and interconnected to a polymer-based, first carrier layer 80 and a polymer-based, second carrier layer 84. The first thermoplastic adhesive layer 50 may be provided between the first side or first surface of core layer 10 and an inward-facing side or interior surface of first carrier layer 80, and the second thermoplastic adhesive layer 52 may be provided between the second side or second surface of core layer 10 and an inward-facing side or interior surface of the second carrier layer 84. In one approach, the first thermoplastic layer 50 may be preconnected to the first carrier layer 80 (e.g. printed or extruded as a coating thereupon) and the second thermoplastic layer 52 may be preconnected to the second carrier layer 84 (e.g. printed or extruded as a coating thereupon).

As shown in FIGS. 8A and 8B, an antenna 70, which may be metallic or other similar material, may be located on the first side of core layer 10 prior to the pre-laminating. The antenna 70 may be operatively interconnected to an integrated circuit chip for contactless signal communications with a contactless chip card reader (e.g. provided in compliance with ISO/IES Standard 14443), as otherwise described herein.

In the illustrated embodiment, the antenna 70 may be electrically coupled to the integrated circuit chip 46 disposed in pocket 42 on the first outer side of the laminated card 1, shown in FIG. 7. In that regard, and as described above, the integrated circuit chip 46 may be supported on a downward-facing side of a substrate, wherein the integrated circuit chip 46 is disposed within the central inner portion of the pocket 42 and an outer annular portion of the downward-facing side of the substrate is adhesively interconnected to and supported by the aforementioned annular seat in the pocket 42.

As shown in FIGS. 8A and 8B the antenna 70 may include an outer portion 70*a* comprising a plurality of loops, and a coupling portion 70*b* comprising a plurality of loops for inductive coupling with a coupling antenna 48 that is supported on the downward-facing side of the aforementioned substrate in the outer annular portion thereof and electrically interconnected to the integrated circuit chip 42, as illustrated in FIG. 7. In conjunction with such embodiments, a plurality of contact pads 44 may be supported on an upward-facing side of the substrate for contact signal communications with a contact chip card reader, thereby providing a dual-interface card. As may be appreciated, the contact pads may be provided for electrical contact interface with a contact chip card reader (e.g. provided in compliance with ISO/IEC Standard 7816). In other embodiments, and as shown in FIG. 9, the antenna 70 may be directly connected to the integrated circuit chip via connections 70*c*.

Figure 15:
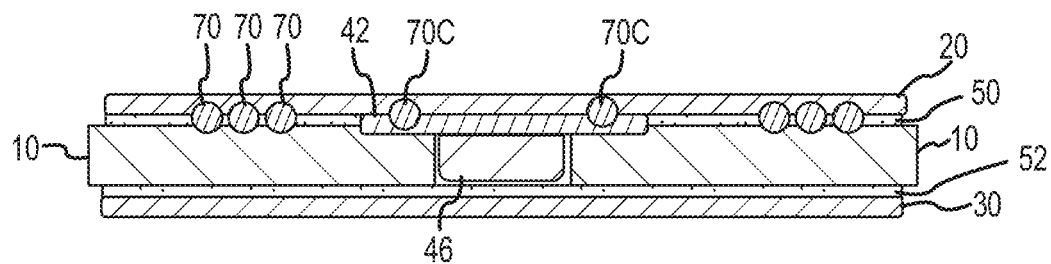
FIG. 15 illustrates a section view of another embodiment of an inlay for inclusion in the embodiment in FIG. 7.
Figure 20:
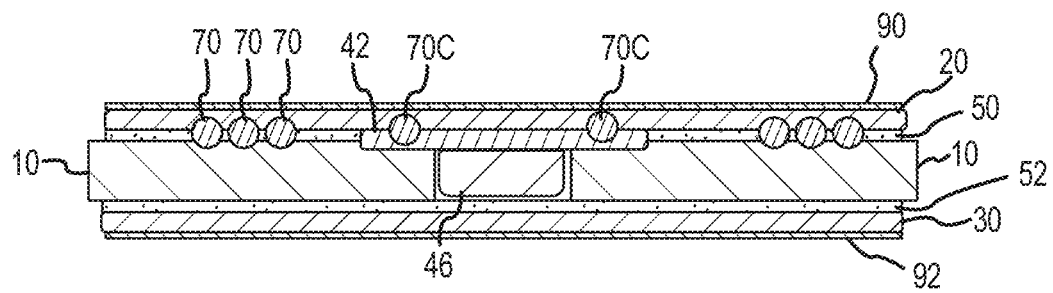
FIG. 20 illustrates a section view of another embodiment of an inlay.

In one approach, the antenna 70 may comprise a continuous length of wire that is partially embedded in to the first side of core layer 10, as shown, for example, in FIG. 15 and in FIG. 20. In another approach, the antenna 70 may comprise a continuous length of wire that is adhered to the first side of core layer 10, such as via ultrasonic welding, adhesive, etching, and/or a combination of various connection techniques. In yet another approach, the antenna 70 may be etched on a carrier layer 71, as shown in FIG. 9 overlying the core layer 10.

In some implementations, the first thermoplastic adhesive layer 50 and the second thermoplastic adhesive layer 52 may each have corresponding activation temperatures of no more than about 130° C., or no more than about 120° C. (e.g. about 90° C. to about 120° C.). Further, the glass transition temperatures corresponding with the first and second carrier layers 80, 84 may be greater than about 130° C., and in contemplated embodiments greater than about 135° C.

The pre-laminating may include heating the plurality of inlay layers to obtain a temperature across the plurality of inlay layers that is equal to or greater than an activation temperature of the first thermoplastic adhesive layer 50 and an activation temperature of the second thermoplastic adhesive layer 52, and less than melting point, such as past the glass transition temperature, but before the viscous temperature point, the first carrier layer 80 and second carrier layer 82, to obtain a temperature of no more than about 120° C. or 135° C., or in some cases no more than about 140° C. (e.g. about 90° C. to about 130° C.), across the plurality of inlay layers, wherein a pressure of about 0.55 N/mm$^2$ to about 0.83 N/mm$^2$, and no more than about 0.90 N/mm$^2$, is applied across the plurality of inlay layers during the heating (e.g. for a total duration of about 10 minutes to about 30 minutes). After the heating, the pre-laminating may include cooling the plurality of inlay layers while applying a pressure of about 0.55 N/mm$^2$ to about 0.83 N/mm$^2$, and not greater than about 0.90 N/mm$^2$, across the plurality of inlay layers (e.g. for up to about 4 minutes), and then while applying a pressure of at least about 1.0 N/mm$^2$ across the plurality of inlay layers (e.g. for a total duration of about 10 minutes to about 30 minutes).

In other embodiments, the pre-laminating may include heating the plurality of inlay layers to obtain a temperature across the plurality of inlay layers that is equal to or greater than an activation temperature of the first adhesive layer 50 and an activation temperature of the second thermoplastic layer 52, and less than a temperature at which the first carrier layer 80 and the second carrier layer 82 are viscous or flowable, to obtain a temperature of about 140° C. across the plurality of inlay layers, wherein a pressure of about 0.55 N/mm$^2$ to about 0.83 N/mm$^2$, and no more than about 0.90 N/mm$^2$, is applied across the plurality of inlay layers during the heating (e.g. for a total duration of about 10 minutes to about 30 minutes). After the heating, the pre-laminating may include cooling the plurality of inlay layers while applying a pressure of about 0.55 N/mm$^2$ to about 0.83 N/mm$^2$, and not greater than about 0.90 N/mm$^2$, across the plurality of inlay layers (e.g. for up to about 4 minutes), and then while applying a pressure of at least about 1.0 N/mm$^2$ across the plurality of inlay layers (e.g. for a total duration of about 10 minutes to about 30 minutes).

In some implementations, the material of the core layer 10 may shrink, expand, and/or otherwise deform during or after the pre-lamination described above. Where an antenna 70 is embedded or otherwise affixed to the core layer 10, the antenna 70 may be originally placed on the core layer 10 to account for deformation of the core layer 10 during pre-lamination (and, in some implementations, end lamination) such that the antenna 70 is spaced to operate at an intended frequency. The placement of the antenna 70 on the core layer 10 may be determined by creating a calibration laminated card using the processes described above and measuring the deformation of the core layer 10 and the placement of the antenna 70 before and after deformation of the core layer 10 and then adjusting the pre-lamination position and orientation in for subsequent cards.

In one example, a laminated card 1 as shown in FIG. 7, may be provided with layers having the following nominal thicknesses:

first overlaminate layer 60 with first outer thermosetting or thermoplastic adhesive layer 54 connected thereto: about 2 mils (0.051 mm);
first support layer 20 with first intermediate thermosetting or thermoplastic adhesive layer 57 connected thereto: about 5 mils-8 mils (0.127 mm-0.203 mm), typically about 6 mils;
first carrier layer 80 with first thermoplastic adhesive layer 50 connected thereto: about 1 mil-3 mils (0.025 mm-0.076 mm);
core layer 10: about 10 mils-12 mils (0.279 mm-0.305 mm);
second carrier layer 82 with second thermoplastic adhesive layer 52 connected thereto: about 1 mil-3 mils (0.025 mm-0.076 mm);
second support layer 30 with second intermediate thermosetting or thermoplastic adhesive layer 58 connected thereto: about 5 mils-8 mils (0.127 mm-0.203 mm), typically about 6 mils (0.152 mm);
second overlaminate layer 62 with second outer thermoset layer 56 applied thereto: about 2 mils (0.051 mm).

In conjunction with such example, the laminated card 1 may have a post-lamination thickness of about 27 mils-33 mils (0.686 mm-0.838 mm).

In other embodiments, the antenna 70 may be supportably connected to a carrier layer 71 that is located between the first side of the core layer 10 and the first carrier layer 80. In turn, in some implementations, the antenna 70 may be electrically interconnected to an integrated circuit chip, supportably connected to the carrier layer, for contactless signal communications with a contactless chip card reader (e.g. provided in compliance with ISO/IES Standard 14443). In such implementations, the laminated card may be provided with no visible integrated circuit chip. Further, in some instances, a complementary film layer 72 may be located between the second side of the core layer 10 and the second carrier layer 82 to balance the carrier layer 71 and generate an evenly balanced card in both thickness and weight.

Figure 10:
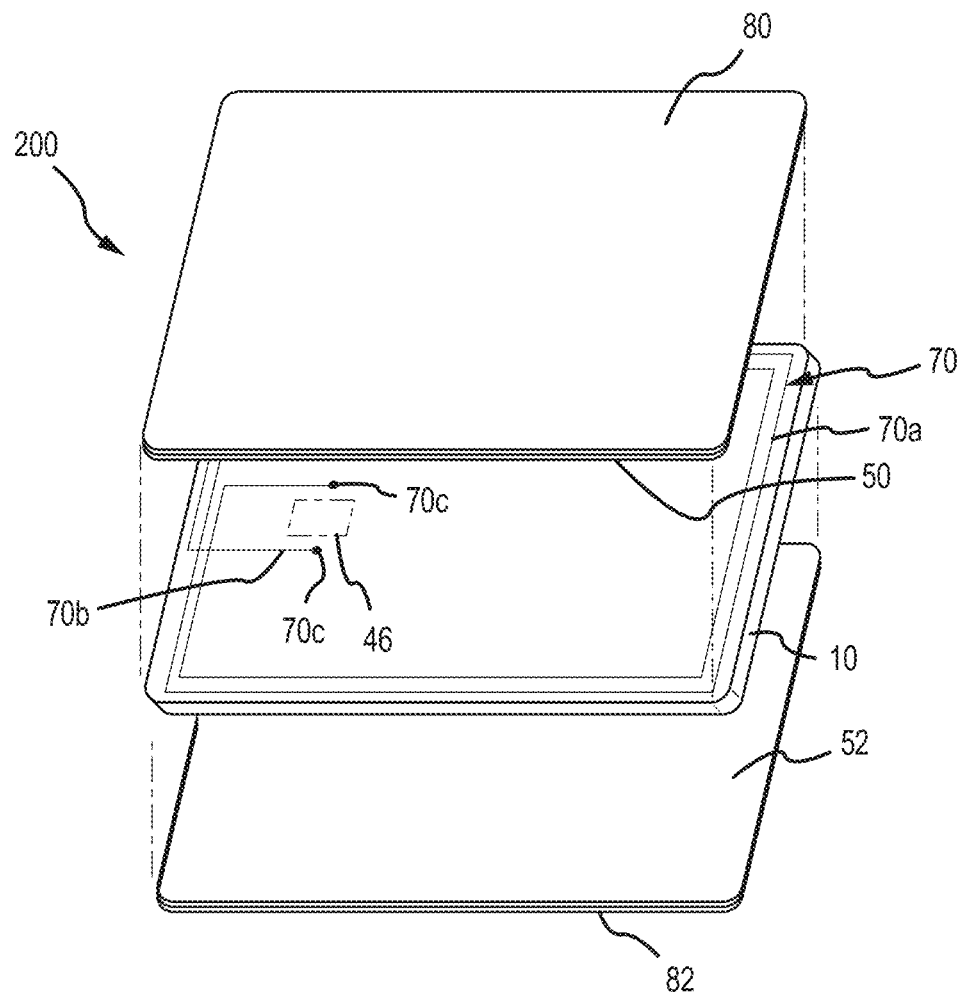
FIG. 10 is an exploded perspective view of another embodiment of an inlay for inclusion in the embodiment of FIG. 7.
Figure 11A:
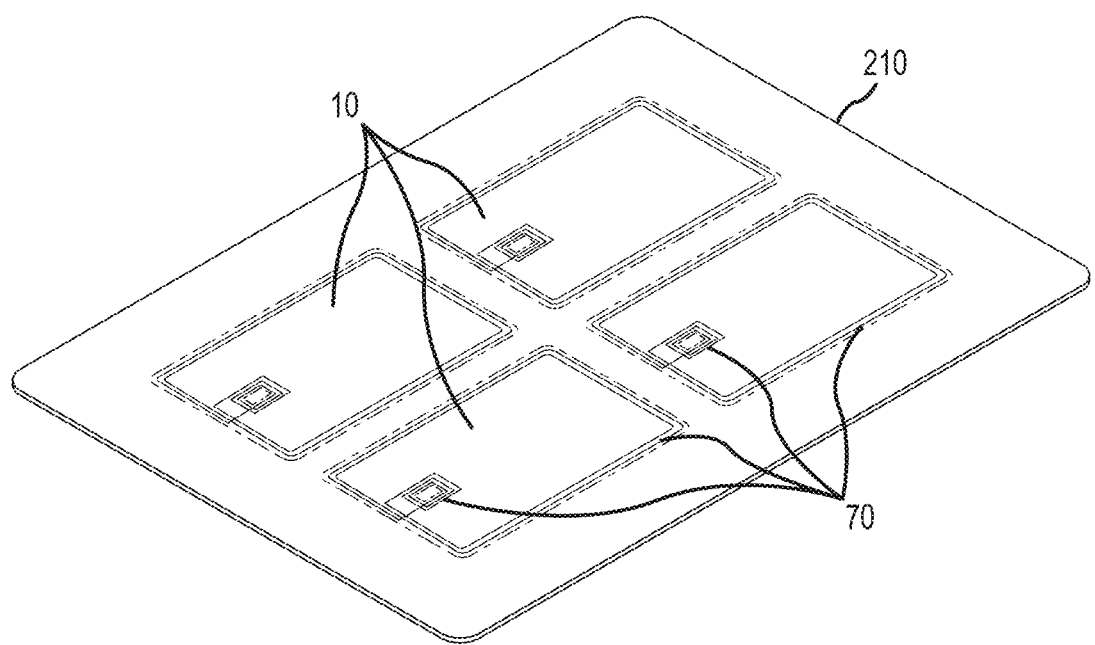
FIG. 11A is a perspective view of an embodiment of a core sheet for use in the multi-layer assembly embodiment of FIGS. 4-6.
Figure 11B:
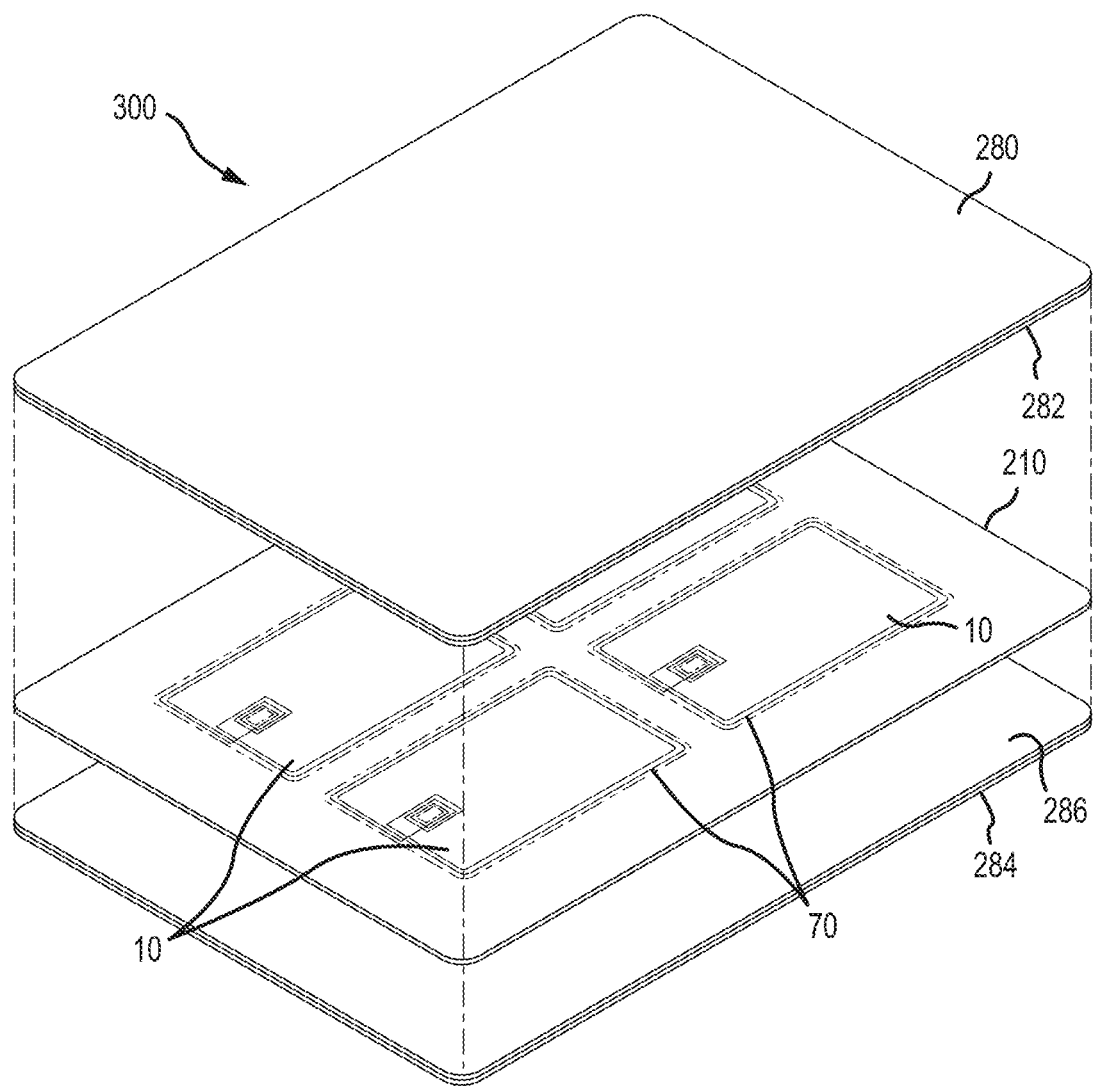
FIG. 11B is an exploded perspective view of an inlay sheet comprising the core sheet embodiment of FIG. 11A for use in the multi-layer assembly of FIGS. 4-6.

Returning now to FIGS. 7, 8A and 8B, the inlay 200 may be provided in each of a plurality of laminated cards produced as described above in relation to FIGS. 4-6. In that regard, and with reference to FIGS. 10A and 10B, an inlay sheet 300 may be utilized that incorporates core sheet 110, wherein the inlay sheet 200 comprises the core sheet 110 prelaminated between a first carrier sheet 280 (e.g. corresponding with and having the same characteristics as first carrier layer 80) having a first thermoplastic adhesive sheet-like layer 250 connected thereto (e.g. corresponding with and having the same characteristics as third thermoplastic adhesive layer 82), and a second carrier sheet 284 (e.g. corresponding with and having the same characteristics as second carrier layer 84) having a second thermoplastic adhesive sheet-like layer 252 connected thereto (e.g. corresponding with and having the same characteristics as second thermoplastic adhesive layer 52).

In that regard, in relation to the method described with reference to FIGS. 4-6, prior to the collating, the method may include completion of the pre-laminating step for each of the plurality of cards by pre-lamination of a plurality of inlay sheets that includes the core sheet 110 located between a first carrier sheet 280 having a first thermoplastic adhesive sheet-like layer 250 supported on an inward-facing side thereof and a second carrier sheet 284 having a second thermoplastic adhesive sheet layer 252 supported on an inward-facing side thereof. Prior to such prelamination, the method may include supportably locating a plurality of antennas 70 on the core sheet 110 in a plurality of regions that correspond with the plurality of regions 101 of the multi-sheet assembly 100.

Figure 16:
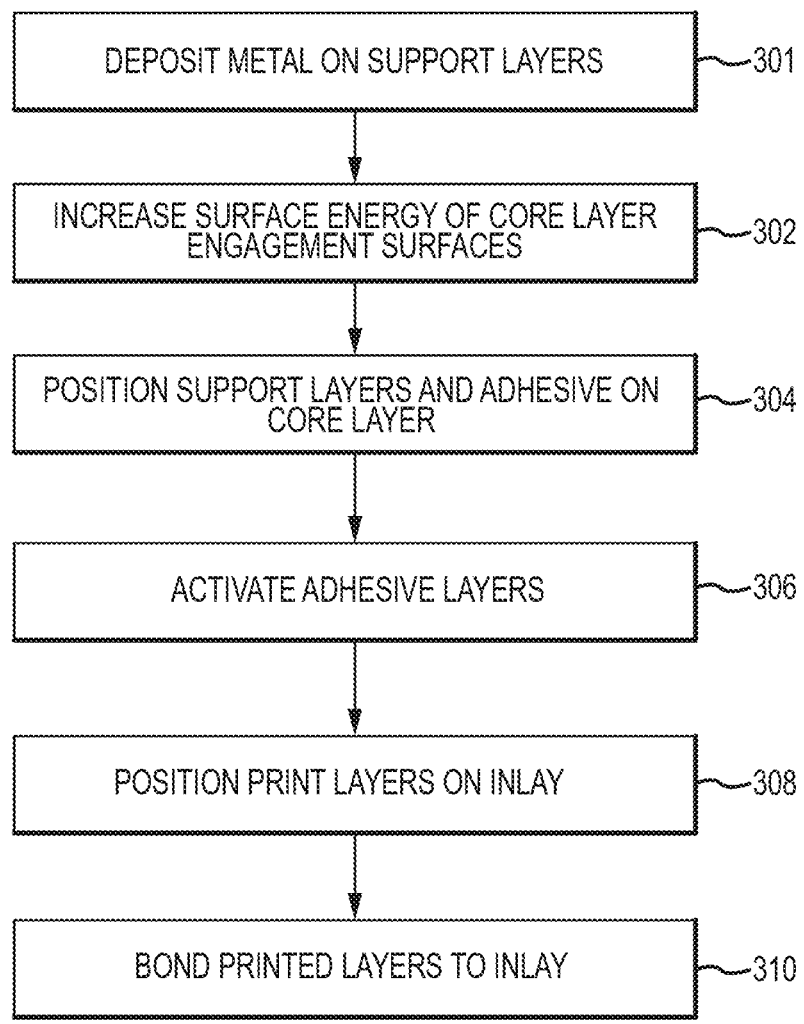
FIG. 16 illustrates an example method for forming a transaction card.

FIG. 16 illustrates a method of manufacturing or producing a laminated card, such as the laminated card 1 or inlay shown in FIGS. 1 and 7 or the laminated card 2 shown in FIGS. 17, 18, 19, and 20. To manufacture or produce the laminated card 2, an optional depositing operation 301 deposits metal on support layers 20, 30. In one implementation, the metal is formed in foil layers 90, 92 and the depositing operation 301 includes adhering the foil layers to the support layers 20, 30. In another implementation of the depositing operation 301, metal to form the metal film layers 90, 92 is heated to a vaporization temperature for the metal or alloy used and then deposited on the outer facing surfaces of the support layers 20, 30. For example, in one implementation an aluminum alloy is heated to its vaporization temperature and vacuum deposited on the outer facing surfaces of the support layers 20, 30.

In another implementation of the depositing operation 301, metal to form the metal film layers 90, 92 is heated to a vaporization temperature for the metal or alloy used and then electrostatically charged. The support layers 20, 30 are then electrostatically charged oppositely from the charged metal vapor (e.g., if the metal vapor particles are positively charged, the support layers 20, 30 are negatively charged). The metal vapor then bonds to the support layers 20, 30 due to the electrostatic charge to form the metal film layers 90, 92.

An increasing operation 302 increases surface energy of core layer engagement surfaces. The increasing operation 302 may include treating a first surface and a second surface of a post-consumer polyethylene core layer 10 to increase a surface energy of the core layer 10, which can act to in effect increase the frictional coefficient of the material. The surface energy may be increased sufficiently to allow bonding between the core layer 10 material and the support layers 20, 30. For example, in instances where the core layer 10 is formed of HDPE, the surface treatment is applied to the interfacing or engagement surfaces or sides of the core that engage with the support layers to raise the surface energy to be above about 50 dyne. As mentioned above, the increasing operation 302 may use a variety of surface treatments or methods for increasing surface energy including, for example, corona, electron beam, flame, and/or primer treatment. Generally, the surface treatment provides a higher surface energy to facilitate bonding of adhesives and support or other layers to the core layer 10.

In some implementations, an additional operation may include interconnecting a communication element with the core layer 10. For example, as shown in FIG. 14, a pocket may be milled in the core layer 10 for interconnecting an IC chip. Alternatively or additionally, an antenna, such as an aluminum antenna may be connected to the core layer 10. In some implementations, an aluminum antenna may be formed on a film that is adhered to the core layer 10 without removing the antenna from the film. In other implementations, an aluminum antenna may be connected directly to the core layer 10 using ultrasonic bonding and/or an adhesive (e.g., an adhesive wire) directly connecting the antenna to the core layer 10. For example, the antenna may be embedded slightly into a surface or side of the core layer 10 and coupled via adhesive, welding, or the like.

A positioning operation 304 positions support layers and adhesive on the core layer. The positioning operation 304 may include layering or coupling a first polymer-based layer 80 and a second polymer-based layer 84 on either side of the core layer 10, where a first adhesive layer is located between the first polymer-based layer and a first surface of the core layer 10 and a second adhesive layer is located between the second polymer-based layer 84 and the second surface of the core layer 10. As described above with respect to FIGS. 8A-10, in some implementations the core layer 10 includes an antenna 70 formed on a carrier layer 71 between the first surface of the core layer 10 and the first polymer-based layer 80. In those implementations, the carrier layer 71 and, in some implementations a second film layer 72, is included in the positioning operation 304.

The positioning operation 304 may layer materials that form the first and second support layers 20, 30, including materials that are rigid and have a higher tensile strength than the core 10. In the positioning operation 304, the materials may be layered such that the core layer 10 is sandwiched or otherwise positioned between the first support layer 80 and the second support layer 84. For example, a first side or surface of the core 10 is overlaid with the first support layer 80 and a second side or surface of the core 10 is overlaid by the second support layer 84 such that only edge surfaces of the core 10 are exposed.

An activating operation 306 activates the adhesive layers to bond the core and layers together. The activation operation 306 activates the first adhesive layer and the second adhesive layer to bond the first polymer-based layer 80 to the first surface of the core layer 10 and to bond the second polymer-based layer 84 to the second surface of the core layer 10. The activating operation 306 may also soften surfaces of the polymer-based layers 80, 84 and/or the core layer 10 to improve adhesion between the layers, e.g., the activating operation may include heating the core and support layers until the materials "soften" to help improve the bond with the adhesive. The activating operation 306 may include applying heat and pressure to the layers to activate the first adhesive layer and the second adhesive layer. The applied temperature is higher than an activation temperature of the first adhesive layer and the second adhesive layer. Additionally, the first and second adhesive layers are formulated to adhere strongly to the different materials of the core and the support layers, e.g., both to post-consumer polyethylene and vinyl or PVC. Generally, operations 302, 304, and 306 may produce an inlay 100, "prelam" component, or base component for use in a graphic lamination or end lamination process for the laminated card 1, as shown in FIG. 7 or may be part of the production of the laminated card 1 shown in FIG. 1. These operations may be performed independently to form the inlay 100.

In some implementations, the inlay 100 may form the final transaction card. In these instances an IC chip may be embedded in the core layer 10 as shown in FIG. 14, and print layers may be connected to the support layers 80, 84 or to the core layer 10 directly. In these implementations, the core layer 10 may be thicker than a core layer 10 included in an inlay 100 forming only part of the thickness of the transaction card.

Operations 308 and 310 may use the inlay 100 or prelam to form the laminated transaction card 1 shown in FIG. 7. For example, a positioning operation 308 positions print layers on the inlay 100. The positioning operation 308 may apply a first print layer to an outer surface of the first polymer-based layer and a second print layer to an outer surface of the second polymer-based layer. A bonding operation 310 bonds the printed layers to the inlay. In some implementations, the bonding or lamination operation 310 applies heat to the first print layer and the second print layer to bond the first print layer to the first polymer-based layer and the second print layer to the second polymer-based layer. Additional operations may add a data transmission element or communication element to the laminated transaction card such as a magnetic strip, antenna, or IC chip.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A laminated transaction card comprising:
a core layer comprising post-consumer polyethylene;
a first support layer comprising polyethylene terephthalate glycol coupled to a first surface of the core layer by a first adhesive layer;
a second support layer comprising polyethylene terephthalate glycol coupled to a second surface of the core layer by a second adhesive layer;
wherein the first adhesive layer and the second adhesive layer comprise an adhesive formulated to bond the post-consumer polyethylene and the support layers.

2. The laminated transaction card of claim 1, further comprising:
an integrated circuit chip disposed within a pocket defined in the first support layer.

3. The laminated transaction card of claim 1, further comprising:
a first metallic film layer deposited on the first support layer; and
a second metallic film layer deposited on the second support layer.

4. The laminated transaction card of claim 3, further comprising:
a first print layer formed on an outer surface of the first metallic film layer; and
a second print layer formed on an outer surface of the second metallic film layer.

5. The laminated transaction card of claim 3, further comprising:
a first overlaminate layer interconnected to the first metallic film layer by a first outer thermosetting adhesive layer; and
a second overlaminate layer interconnected to the second metallic film layer by a second outer thermosetting adhesive layer.

6. The laminated transaction card of claim 5, wherein the first overlaminate layer and the second overlaminate layer comprise polyvinyl chloride.

7. The laminated transaction card of claim 1, wherein the first support layer and the second support layer comprise post-consumer material.

8. An inlay for a laminated transaction card comprising:
a core layer comprising post-consumer polyethylene;
a first support layer comprising polyethylene terephthalate glycol adhered to a first surface of the core layer by a first adhesive layer positioned between the first support layer and the first surface of the core layer;
a first metal layer deposited on an outer surface of the first support layer; and
a second support layer comprising polyethylene terephthalate glycol adhered to a second surface of the core layer by a second adhesive layer positioned between the second support layer and the second surface of the core layer.

9. The inlay of claim 8, further comprising:
an antenna positioned between the first surface of the core layer and the first support layer.

10. The inlay of claim 8, wherein the first adhesive layer and the second adhesive layer are ethylene vinyl acetate.

11. The inlay of claim 8, further comprising at least one of an antenna, a magnetic strip, or an integrated circuit chip.

12. The inlay of claim 8, wherein the first metal film layer and the second metal film layer comprise aluminum.

13. A method of producing a laminated transaction card, the method comprising:
depositing a first metal layer on a first support layer comprising polyethylene terephthalate glycol and a second metal layer on a second support layer comprising polyethylene terephthalate glycol;
treating a first surface and a second surface of a core layer so as to increase the surface energy of the core layer, wherein the core layer comprises post-consumer polyethylene;
positioning the first support layer and the second support layer on opposing sides of the core layer, wherein a first adhesive layer is positioned between the first support layer and the first surface of the core layer and a second adhesive layer is positioned between the second support layer and the second surface of the core layer; and
activating the first adhesive layer and the second adhesive layer to bond the first support layer to the first surface of the core layer and to bond the second support layer to the second surface of the core layer.

14. The method of claim 13, wherein the first adhesive layer is positioned between an inner surface of the first support layer and the core layer and the first metal layer is deposited on an outer layer of the first support layer.

15. The method of claim 13, wherein activating the first adhesive layer and the second adhesive layer comprises applying heat and pressure to the first adhesive layer and the second adhesive layer.

16. The method of claim 15, wherein the heat applied to the first adhesive layer and the second adhesive layer is above an activation temperature of the first adhesive layer and the second adhesive layer and above a glass transition temperature of the first support layer and the second support layer.

17. The method of claim 13, wherein depositing a first metal layer on a first support layer and a second metal layer on a second support layer comprises vaporizing the first metal layer and the second metal layer and using vacuum deposition to deposit the first metal layer on the first support layer and to deposit the second metal layer on the second support layer.

18. The method of claim 13, further comprising:
applying a first print layer to an outer surface of the first metal layer and a second print layer to an outer surface of the second metal layer; and applying heat to the first print layer and the second print layer to bond the first print layer to the first metal layer and the second print layer to the second metal layer.

19. The method of claim 13, wherein treating the first surface and the second surface of the core layer comprises applying a corona treatment to the first surface of the core layer and the second surface of the core layer.

20. The method of claim 13, wherein activating the first adhesive layer and the second adhesive layer comprises applying varying heat and pressure to the first adhesive layer and the second adhesive layer over predetermined periods of time.

\* \* \* \* \*